(12) United States Patent
Salvador

(10) Patent No.: US 11,443,298 B2
(45) Date of Patent: Sep. 13, 2022

(54) SYSTEM, METHOD AND APPARATUS FOR UPDATING A STORED VALUE CARD

(71) Applicant: EINNOVATIONS HOLDINGS PTE. LTD., Singapore (SG)

(72) Inventor: Rodrigo S. Salvador, Makati (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 773 days.

(21) Appl. No.: 15/512,040

(22) PCT Filed: Sep. 14, 2015

(86) PCT No.: PCT/SG2015/050316
§ 371 (c)(1),
(2) Date: Mar. 16, 2017

(87) PCT Pub. No.: WO2016/043658
PCT Pub. Date: Mar. 24, 2016

(65) Prior Publication Data
US 2017/0243197 A1    Aug. 24, 2017

(30) Foreign Application Priority Data
Sep. 16, 2014   (SG) ............................ 10201405789Y

(51) Int. Cl.
*G06Q 20/34*    (2012.01)
*G06Q 20/02*    (2012.01)
(Continued)

(52) U.S. Cl.
CPC ......... *G06Q 20/342* (2013.01); *G06F 21/445* (2013.01); *G06Q 20/023* (2013.01);
(Continued)

(58) Field of Classification Search
None
See application file for complete search history.

(56) References Cited

U.S. PATENT DOCUMENTS 7,315,843 B2 *   1/2008   Diveley ............... G06Q 20/351
                                                   705/40
8,083,133 B2 *  12/2011   Seifert ............... G06Q 30/0601
                                                  705/26.1
(Continued)

FOREIGN PATENT DOCUMENTS

CN        1798382 A       7/2006
CN      101364329 A       2/2009
(Continued)

OTHER PUBLICATIONS

European Search Report for Application No. EP15842259.
(Continued)

*Primary Examiner* — Jamie R Kucab
(74) *Attorney, Agent, or Firm* — JCIP; Joseph G. Chu; Jeremy I. Maynard

(57) ABSTRACT

A system for updating a stored value card comprising a transaction device for receiving a request to update the stored value card; a transaction manager arranged in data communication with the transaction device; the transaction manager operable to process the request to update the stored value card; a clearing house arranged to receive processed request from the transaction manager and create a pending transaction status; and a stored value updater network operable to receive the stored value card and thereafter retrieve an identifier of the stored value card; the stored value updater network further operable to retrieve the pending transaction status from the clearing house; wherein upon successful verification of the pending transaction status and the stored value card, the stored value updater network updates the stored value card.

2 Claims, 32 Drawing Sheets

(51) Int. Cl.
*G06F 21/44* (2013.01)
*G06Q 20/32* (2012.01)
*G06Q 20/38* (2012.01)
*G06Q 20/40* (2012.01)
*H04L 9/40* (2022.01)

(52) U.S. Cl.
CPC ....... *G06Q 20/322* (2013.01); *G06Q 20/3829* (2013.01); *G06Q 20/4097* (2013.01); *H04L 63/0869* (2013.01); *G06Q 2220/00* (2013.01)

(56) References Cited

U.S. PATENT DOCUMENTS

| | | | | |
|---|---|---|---|---|
| 8,733,637 | B1* | 5/2014 | Cedeno | G06Q 30/02 235/380 |
| 2001/0001321 | A1* | 5/2001 | Resnick | G06Q 20/04 705/17 |
| 2001/0018679 | A1 | 8/2001 | Lee | |
| 2003/0019927 | A1 | 1/2003 | Lindgren et al. | |
| 2003/0140007 | A1* | 7/2003 | Kramer | G06Q 20/12 705/40 |
| 2005/0216421 | A1* | 9/2005 | Barry | H04M 15/8044 705/64 |
| 2006/0047589 | A1* | 3/2006 | Grau | G06Q 40/00 705/35 |
| 2009/0106692 | A1* | 4/2009 | Bhavani | G16H 40/20 715/810 |
| 2011/0165866 | A1* | 7/2011 | Dixon | G06Q 20/342 455/414.1 |
| 2011/0302081 | A1 | 12/2011 | Saunders et al. | |
| 2012/0231844 | A1* | 9/2012 | Coppinger | G06Q 20/3278 455/558 |
| 2012/0239542 | A1* | 9/2012 | Preston | G06Q 30/06 705/35 |
| 2012/0323765 | A1* | 12/2012 | Spaulding | G06Q 20/2295 705/39 |
| 2013/0013349 | A1* | 1/2013 | Tucker | G06Q 10/02 705/5 |
| 2013/0018783 | A1 | 1/2013 | Ansari | |
| 2013/0297473 | A1* | 11/2013 | Wolfe | G06Q 30/0207 705/35 |
| 2014/0046737 | A1* | 2/2014 | Graves | G06Q 20/354 705/13 |
| 2014/0058858 | A1 | 2/2014 | Stecewycz | |
| 2014/0114842 | A1* | 4/2014 | Blackhurst | G06Q 30/06 705/39 |

FOREIGN PATENT DOCUMENTS

| | | |
|---|---|---|
| CN | 101990029 A | 3/2011 |
| CN | 103038790 A | 4/2013 |
| CN | 103718200 A | 4/2014 |
| CN | 104036390 A | 9/2014 |
| EP | 2620902 A1 | 7/2013 |

OTHER PUBLICATIONS

Department of Finance and Deregulation—Australian Government, 'National Smartcard Framework, Smartcard Project Design Guide', Dec. 2008 [retrieved from internet on Oct. 26, 2015], ,URL: www.finance.gov.au/files/2012/04/smartcard-project-design-guide. pdf>.
International Search Report and Written Opinion of PCT/SG2015/050316; International Preliminary Report on Patentability of PCT/SG2015/050316.
Search Report and Written Opinion from the Intellectual Property Office of Singapore for Application No. 10201709584P.
Chinese Office Action for Chinese Patent Application No. 201580059072.6.

* cited by examiner

SYSTEM, METHOD AND APPARATUS FOR UPDATING A STORED VALUE CARD

FIELD OF THE INVENTION

The present invention relates to a system and method and apparatus for updating a stored value card (hereinafter referred to as SVC). In particular, the system, method and apparatus are suitable (but not limited) for provisioning credit to a SVC suitable for use with a ticket vending machine for certain transportation means and will be described in such a context.

DISCUSSION OF THE BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Stored value cards (SVC) are typically used for loading and reloading of electronic credit or value for a variety of purpose. One purpose is to access certain means of transportation such as metro rail, subway, or mass rapid transit (MRT) as colloquially referred to in certain countries.

There exists in the market a variety of SVC loading/reloading equipment. One commonly used SVC equipment is the Ticket Vending Machine (hereinafter referred to as TVM). In addition, contactless ATM, contactless POS terminal—and their backend system may also be used for the loading/reloading of SVC.

There however exist several shortcomings associated with such equipment. Firstly, TVM generally incur relatively high cost to produce and/or deploy. It would be commercially prohibitive to have a network of TVMs and contactless POS terminals covering the entire country, since a TVM may cost around USD 10, 000 each and a contactless POS terminal costs around USD 500.

Another shortcoming associated with the prior art is that the TVM, like an ATM machine, is large and bulky due to its heavy metal enclosure. The relatively large machine prevents thieves from forcing the machine open to access its cashbox.

Yet another shortcoming associated with the TVM is that the TVM requires a SAM (Secure Access Module) within the machine for operation. A SAM is typically a smartcard (which looks like a SIM card) and which contains details of the Card Master Keys for a particular card issuer. The card master keys allow the TVM to debit and credit the stored-value on the issuer's card. Thus, the SAM is very valuable and is heavily safeguarded to prevent the same from falling into the hands of hackers, which may then use the SAM for fraud. As with the cashbox, the SAM is protected by the heavy metal casing of the TVM (Note: A contactless POS terminal also uses a SAM but is not armoured, since it is assumed to be constantly attended to at a merchant site). The TVM is designed to use a SAM because one of the design's basic assumptions is that the network connectivity to the backend (usually the clearinghouse of the metro rail) is not 100% reliable; i.e., the connectivity may break intermittently and that the required bandwidth (e.g., 64 Kbps) is not always guaranteed. Thus, the card master keys have to be present within the device itself to allow offline authentication. Although this assumption may be true in the recent past back in the 1990s, it may be arguable today. An associated problem with the SAM is that it require more than one SAM slot if the TVM is to serve cards from more than one card issuer. A typical TVM has up to four SAM slots, to hold four SAMs representing the card master keys of up to four issuers only. Thus, the number of card issuers that a TVM can serve is limited by the number of SAM slots that it has.

Yet another shortcoming of the TVM is the imposed "Minimum Reload Amount" This may be due to the limitations of the TVM's cash bill acceptor, or to the lack of a coin acceptor. It may also be due to an artificial setting to offset the high cost of the TVM in some way; and may not be suitable for developing countries where cash flow problems discourages a customer from loading/reloading his SVC at a fixed minimum reload amount.

In light of the above, there exists a need to provide an apparatus, system and method for alleviating at least one of the above-mentioned shortcomings.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

Furthermore, throughout the specification, unless the context requires otherwise, the word "include" or variations such as "includes" or "including", will be understood to imply the inclusion of a stated integer or group of integers but not the exclusion of any other integer or group of integers.

In the context of the description, it is to be understood that the updating of the stored value card may include one or more of the following: 'top-up', 'reload', 'provisioning of credit(s)', checking of status, updating of transaction records etc.

The invention seeks to integrate the credit reloading service for a stored value card (SVC) with a network provider. The network provider may be a telecommunications carrier. The invention seeks to achieve a more efficient utilisation of resources by leveraging on existing telecommunication infrastructure while not compromising security.

The invention reduces the relatively high cost associated with a TVM by providing a method or process for updating the SVC. The term 'update' includes provisioning of credit such as reloading. The update or reloading process may be divided into two steps: (1) an initial reloading step (wherein a pending reload is performed in the backend) performed using an existing network provider with agents, and (2) a subsequent "reflection" step (where the pending reload is physically reflected to the stored-value on the card) performed using a pool of devices at the sites where the stored-value cards will be likely used; e.g., at the metro rail stations; as well as at places easily accessible to the public; e.g., bus stations, corner stores. The device, which is another aspect of the invention, is called a Stored-Value Updater (SVU) device. The SVU is inexpensive enough to be deployed unmanned and at large numbers at sites where required.

As the SVU device involves no cash (since the cash handling part of the transaction is performed at the backend of a Telco Agent network), the SVU device does not require extensive handling.

With regards to the reliability of backend connectivity and hence the need for SAM, the invention assumes that any network connectivity to the backend can be made 100% reliable using current network redundancy (for 100% uptime) and quality-of-service (for guaranteed bandwidth)

mechanisms. With such an assumption, the invention does not require a SAM to be integrated with the SVU device at the front-end, by having the equivalent SAM functionality at the backend. SVC authentication may be performed online using the card master keys at the backend. Having the SAM equivalent at the backend frees the SVU device from the need to have a bulky metal enclosure for protection. In the event of theft (say, the device is pried off the wall with a crowbar), the thief would have no access to the precious card master keys since they were never in the device in the first place. The invention, through the backend SAM equivalent, which is not constrained by the need to have physical SAMs present, breaks this limitation, allowing a much larger number of supported card issuers (e.g., twenty or more).

Further, as the cash handling part of the transaction may be effected by existing telecommunications network structure involving agents/retailers (hereinafter referred to as Telco Agent Network), the invention does away with a "Minimum Reload Amount", or at the least, makes it negligibly small; e.g., down to PHP10 or SGD0.28. This is appropriate to a developing country, for example the Philippines, where cash flow problems discourage a customer from reloading his stored-value card at a "Minimum Reload Amount" higher than PHP10.

In an aspect of the invention, the agents/retailers involved (also referred to as 'telco agents') can act as prepaid credit top-up stations and traders of prepaid airtime in electronic money. These agents accept cash from customers in exchange for prepaid airtime reload, or for electronic-money reload. Each transaction is performed using a Telco Agent SIM, which holds menus for bulk transfer, as well as individual retail, of prepaid airtime and e-money. As the number of telco agents in a country such as the Philippines exceeds two million (in a population of 99 million), such an arrangement and model is useful for consumers.

In situation where a consortium of contactless metro rail fare payment are formed by multiple parties, including major telecommunications mobile operators which in turn operate a sizable or largest Telco Agent Networks in a country (thus allowing the telco agent networks to cover the entire nation), multiple telco agent networks may be utilized for Stored-Value Card reloading, with the further objective of having the Stored-Value Card usable not just for rail and toll payments, but for general retail as well.

Reloading Stored-Value Cards using the current telecommunications agent networks presents a challenge because the mobile phones carried by Telco Agents are not equipped for reading of and writing to Stored-Value Cards. The invention seeks to address this problem by extending the traditional Telco Agent Network using a separate network of Stored-Value Updater (SVU) devices.

In accordance with an aspect of the invention there is a system for updating a stored value card comprising a transaction device for receiving a request to update the stored value card; a transaction manager arranged in data communication with the transaction device; the transaction manager operable to process the request to update the stored value card; a clearing house arranged to receive processed request from the transaction manager to create a pending transaction status; and a stored value updater network operable to receive the stored value card and thereafter retrieve an identifier of the stored value card; the stored value updater network further operable to retrieve the pending transaction status from the clearing house.

Preferably, the transaction device is a mobile phone device.

Preferably, the request to update the stored value card comprises an identifier of the stored value card and a value to be updated.

Preferably, upon receipt of the request to update the stored value card, the transaction manager generates a transaction reference to be sent to the clearing house.

Preferably, the clearing house is in data communication with a plurality of card hosts for settlement of the stored value update.

Preferably, each of the plurality of card hosts is in data communication with a database for maintaining stored value card accounts.

In accordance with another aspect of the invention there is a stored value updater network arranged to receive a request to update a stored value card, the stored value updater network comprising a front-end device having a stored value card reader/writer for reading and updating the stored value card; and a backend manager in data communication with the front-end device, wherein the backend manager positioned remotely relative to the front-end device.

Preferably, the front-end device comprises a subscriber identification module.

Preferably, the data communication between the front-end device and the backend manager is always on.

Preferably, the backend device comprises a hardware security module.

Preferably, the hardware security module implements Secure Access Module (SAM) functionality.

Preferably, the front-end device is authenticated against the backend manager at predetermined intervals.

Preferably, the authentication between the front-end device and backend manager is based on mutual authentication.

Preferably, the authentication involves the generation of at least one nonce associated with the front-end device.

Preferably, the authentication involves the generation of at least one nonce associated with the backend manager.

Preferably, the front-end device is operable to be in data communication with the backend manager using a user datagram protocol (UDP) based communication protocol.

In accordance with another aspect of the invention there is a method for updating a stored value card comprising the steps of receiving from a transaction device a request to update the stored value card; processing the request to update the stored value card by a transaction manager arranged in data communication with the transaction device; receiving the processed request from the transaction manager to create a pending transaction status; receiving from a stored value updater network the stored value card and thereafter retrieving an identifier of the stored value card; the stored value updater network further operable to retrieve the pending transaction status; and verifying the pending transaction status and the identifier of the stored value card.

Preferably, upon successful verification of the pending transaction status and the stored value card, the stored value updater network updates the stored value card.

Preferably, the stored value updater network comprises a front-end device having a stored value card reader/writer for reading and updating the stored value card; and a backend manager in data communication with the front-end device, wherein the backend manager is positioned remotely relative to the front-end device.

Preferably, the method further comprises the step of authenticating the front-end device against the backend manager at predetermined intervals.

Preferably, the step of authenticating is based on a mutual authentication process.

Preferably, the step of authenticating comprises generating at least one nonce associated with the front-end device.

Preferably, the step of authenticating comprises generating at least one nonce associated with the backend manager.

Preferably, the front-end device is operable to be in data communication with the backend manager using a user datagram protocol (UDP) based communication protocol.

In accordance with another aspect of the invention there is a stored value updater network for updating a stored value card comprising a front-end device having a stored value card reader/writer for reading and updating the stored value card; and a backend manager arranged in data communication with the front-end device, the backend manager positioned remotely relative with the front-end device; wherein the backend manager is arranged to be in data communication with a network operator for providing notification to a user device associated with an account of the stored value card.

Preferably, the backend manager is arranged in data communication with a clearing house to receive a request from the stored value card to create a pending transaction status.

Preferably, the backend manager is operable to communicate with the front-end device using a user datagram protocol (UDP) based communication protocol.

In accordance with another aspect of the invention there is a transaction manager for facilitating the update of a stored value card, the transaction manager operable to receive and process a request for updating the stored value card for generation of a pending transaction status for subsequent verification, the transaction manager arranged in data communication with a stored value updater network.

BRIEF DETAILS OF THE DRAWINGS

In order that this invention may be more readily understood and put into practical effect, reference will now be made to the accompanying drawings, which illustrate preferred embodiments of the invention, and wherein.

Other arrangements of the invention are possible and, consequently, the accompanying drawings are not to be understood as superseding the generality of the description of the invention.

DESCRIPTION OF EMBODIMENTS OF THE INVENTION

Figure 1:
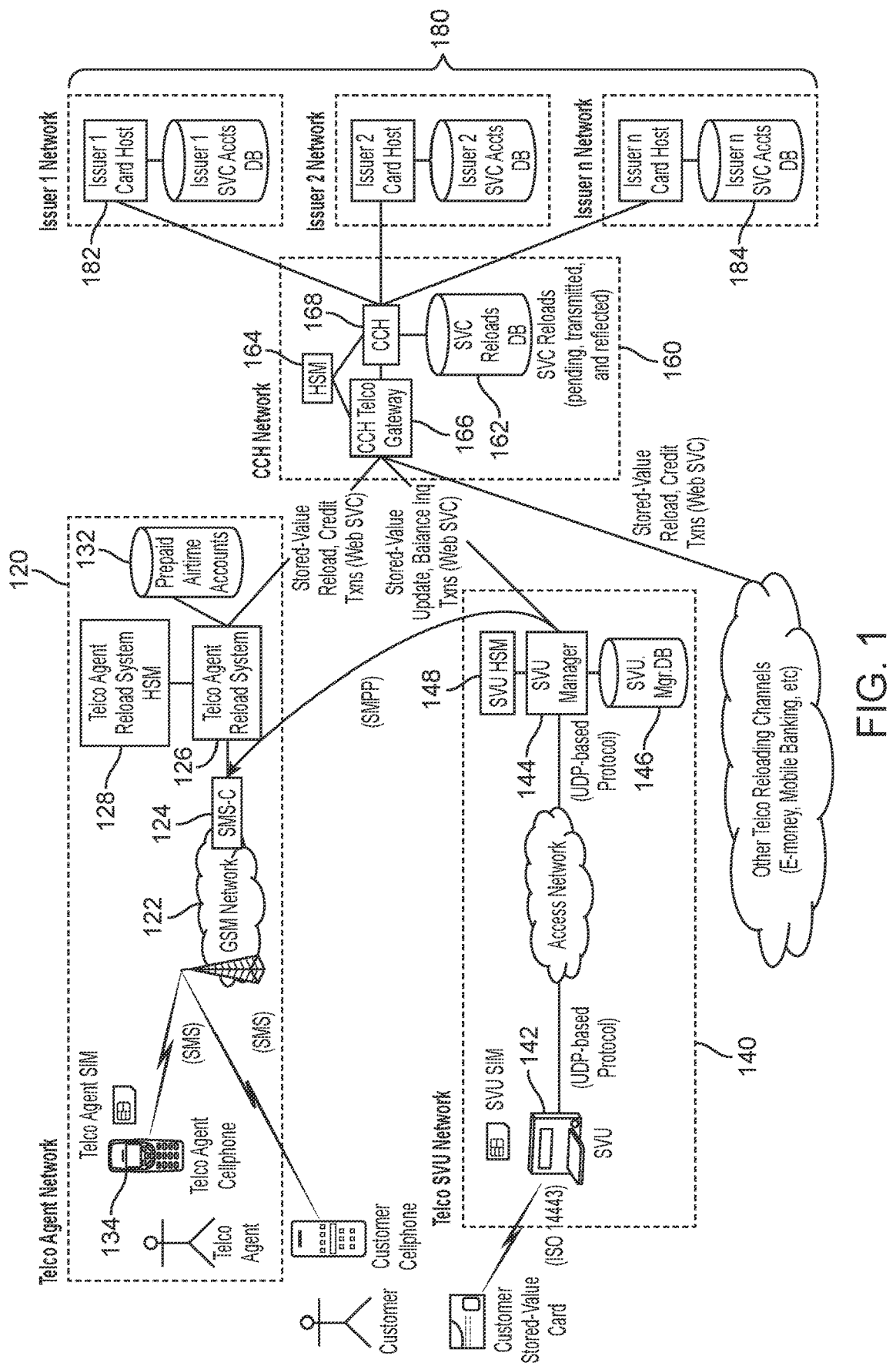
FIG. 1 is a system block diagram for updating a stored-value card in accordance with an embodiment of the invention.

In accordance with an embodiment of the invention there is a system 100 for updating a stored-value card (SVC). The term 'updating of the SVC' may include reloading or update of credits to the SVC. A block diagram of system 100 is as illustrated in FIG. 1. The system 100 may be implemented by a network provider or operator, such as a telecommunications operator, and comprises, at the front-end, agents (hereinafter referred to as 'telco agents'), stored value updater devices (hereinafter referred to as SVU devices); and, at the backend, networks and network resources for provisioning credit in the form of update, loading/reloading of a stored-value card.

The system 100 comprises a telecommunications agent network 120, a stored value updater that may be managed or in data communication with a telecommunications operator (hereinafter referred to as 'Telco SVU network') 140, a central clearing house (CCH) network 160, and at least one issuer network 180. Preferably, there exists a plurality of issuer networks 180.

Telecommunications agent network 120 (hereinafter referred to as Telco Agent network 120) is a telecommunications network having at least a mobile cellular network such as a GSM network 122, a SMS centre 124, a transaction facilitator/manager 126 for receiving instructions for loading/reloading of credits and fulfilling the functions of a reload. A hardware security module (HSM) 128 is included to support the transaction facilitator 126. The transaction facilitator 126 is in data communication with an account database 132 to retrieve any user details necessary for completion of transactions. Account database 132 may be a database containing details of prepaid subscribers and their remaining/current airtime credit, for example. The transaction facilitator/manager 126 may also include electronic wallet functions such as functions for providing prepaid airtime reloading.

Each telco agent is equipped with a transaction device that may be in the form of a mobile communication device 134 operable to communicate with the telecommunications operator; and a Telco Agent Subscriber Identity Module (SIM), which holds 'Stored-Value Card Reload' SIM application. The Telco Agent SIM may further be configured with other applications (functions) such 'Prepaid Airtime Reload' and 'E-Money Reload' SIM application and crypto routines, but also those Telecommunications network 120 is capable of receiving data, and in particular, updates requests in the form of, for example, SMS transaction messages relating to the top up/loading and reloading of stored value. It is to be appreciated that stored value may be transacted between at least one stored value agent and a subscriber of the Telecommunications network.

Telco SVU network 140 may be part of the telecommunications network having a plurality of SVU devices 142 at the frontend and the SVU Manager 144, at the backend. The SVU Manager 144 typically comprises one or more servers, distributed or otherwise, in data communication with one or more databases 146 that maintain records of all SVU devices 142 and their statuses. The statuses may include whether the SVU is valid, blocked due to downtime, lost, etc. The SVU manager 144 is operable to be in data communication with the SMS centre 124. Telco SVU network 140 further comprises a hardware security module 148 for encryption or decryption. The front-end devices 142 and backend SVU manager 144 may communicate via user datagram protocol (UDP) via a suitable access network. It is to be appreciated that the SVU manager 144 is geographically separated from the SVU devices 142, i.e. positioned remotely relative to the SVU devices 142.

Each SVU device 142 can detect the particular contactless protocol of a series of chips widely used in contactless smart cards and proximity cards (For example, MiFare™ Classic, MiFare DESFire EV1™, Open Standards for Public Transport (OSPT) which includes open security standard such as CiPurse™) riding on top of the standards such as the ISO 14443 contactless smartcard standard and the ISO 7816 smartcard commands and storage structures standard, and process the card accordingly.

The SVU device 142, through its constant data connectivity with the SVU manager 144, can be monitored in a real-time basis. It allows real time monitoring through keep-alive messages closely monitored by the SVU Manager 144 backend node. Any downtime may thus be easily detected, allowing quick servicing of the SVU device by a dispatched technician. Theft is also easily detected (the device is discovered missing), allowing quick blocking of the device at the backend.

The SVU device 142, through its network connection capability, can have its firmware upgraded remotely. The SVU device 142 can hence be used over the public Internet with no security concerns. It allows this by encrypting and signing its transaction data using session keys.

The CCH Network 160 comprises a Central Clearing House 168 for maintaining a database 162 for stored value card reloads. The clearinghouse is the ideal location for database 162 because the clearinghouse is a hub to which all involved stored value Card Issuers connect. A hardware security module (HSM) 164 provides crypto-processing and necessary verification and encryption to a CCH gateway node 166 (where the Telco Agent Network 120 and the Telco SVU Network 140 are both operable to connect to the CCH Network).

Each Issuer Network 180 comprises an issuer host 182 and a stored value card account database 184 operable to be in data communication with the issuer host 182. The card account database 184 at least records or tracks the account balance associated with each stored value card. There may be a plurality of issuer hosts 182 as illustrated in FIG. 1. Where there are multiple network hosts 182, one or more issuer host 182 may include issuer hosts from different organisations.

Figure 2:
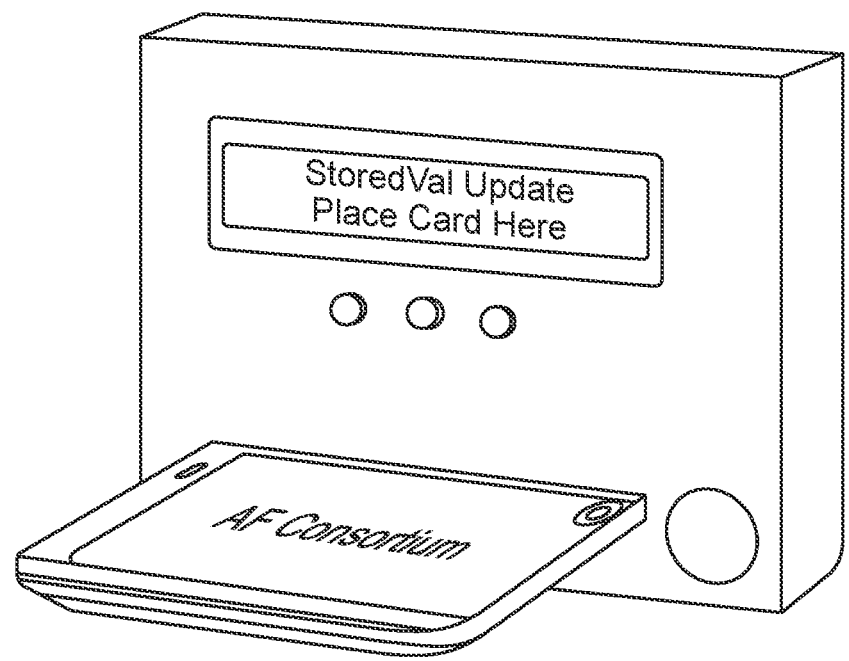
FIG. 2 is a perspective view of the stored-value updater device in accordance with an embodiment of the invention.
Figure 3:
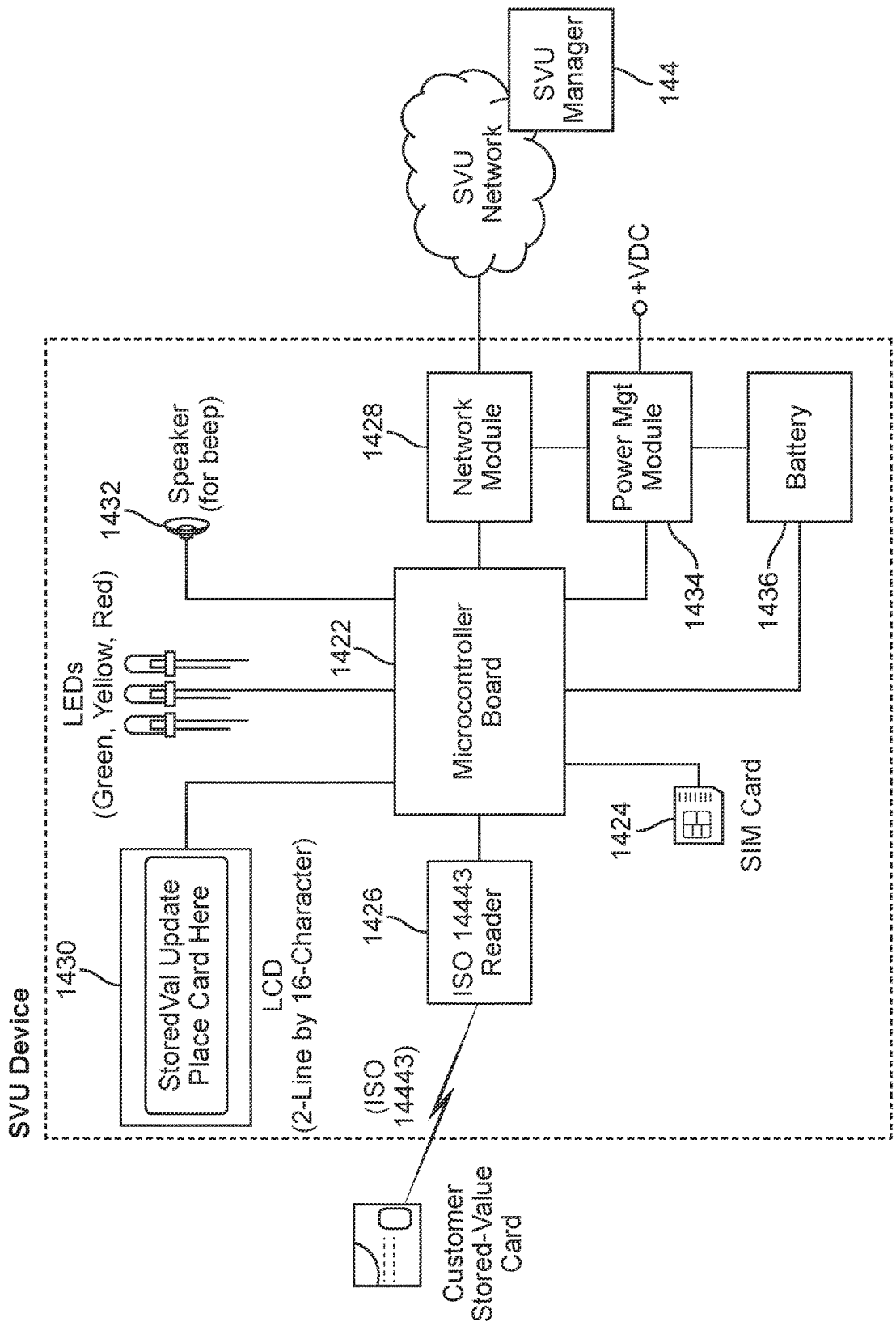
FIG. 3 illustrates the component diagram of a stored-value updater device in accordance with an embodiment of the invention.

FIGS. 2 and 3 illustrate an example of the SVU device 142 and its components. The SVU device comprises a microcontroller board 1422, a SIM card 1424, a contactless card reader 1426, and a network module 1428. SVU device 142 may further comprise display 1430, speakers 1432, and a power management module 1434.

Microcontroller board 1422 may comprise a processor chip (e.g. an ARM™ processor chip) or equivalent. The microcontroller board 1422 may further comprise a real-time clock mounted thereon for synchronization via Network Time Protocol NTP (NTP) against an NTP server in the backend of the SVU Network. The microcontroller board 1422 holds software logic for the performance of stored value top up or reload which will be discussed below.

The subscriber identity module (SIM) 1424 is used to contain data relating to the identity of the SVU Terminal and any Terminal Key, which will be used for authenticating the device 142 against the SVU Manager 144; and for the generation of session keys to encrypt and sign any transaction data for security.

The contactless card reader 1426 is an interface for reading information from a contactless card for the purpose of topping up value/credit. The reader 1426 may be a contactless integrated circuit card reader based on international standards that defines proximity cards for identification, and the transmission protocols for communicating with it. Typically the international standard ISO 14443 is used. The contactless card in this embodiment is the stored value card.

The network module 1428 is used to provide network connectivity to, for example, a RJ-45 physical connector module for Ethernet LAN connectivity, a GSM GPRS module, and/or other module for wireless network communication etc.

Display 1430 comprises a LCD display for purpose of displaying instructions and information (e.g., card balance) to a customer/user. Display 1430 may further comprise LEDs for display of the operational and/or downtime status of the card reader 1426. For example, a green LED may be used to indicate that the SVU device 142 is operational, a yellow LED may be used to indicate that card update is in progress (and that the card should not be removed from the card tray), and a red LED to indicate device downtime.

Speakers 1432 may complement the display 1430 to provide audible sounds/beeps for indicating operational status.

A power management module 1434 comprises a battery for powering the SVU device 142 as well as to provide a rudimentary form of an Uninterrupted Power Supply (UPS) to allow the SVU device 142 to complete an ongoing transaction in the event of a power failure. The power management module 1434 may further comprise charging means to charge the battery, as well as to detector(s) for detecting the presence/absence of electrical power and the current battery level.

The interaction among the four networks, i.e. telco agent network 120, telco SVU network 140, CCH network 160, and the at least one issuer network 180 is described as follows.

Each Telco agent within the telco agent network 120 is equipped with a transaction device in the form of a mobile device with dedicated SIM programed to implement the 'Stored-value card reload' routine in addition to existing routines for other types of transactions such as, but not limited to, performing Prepaid airtime and electronic wallet type transactions.

The 'Stored-Value Card Reload' is performed via the Telco Agent Network 120, which relays the reload transaction request from the Telco Agent 120 to the CCH Telco Gateway 166. It is to be appreciated that instead of crediting the SVC Account Balance (in the Issuer's SVC Accounts Database), the CCH network 160 creates an 'SVC Reload' record with a 'Pending transaction' status in the CCH's SVC Reloads Database. The status will later be changed to 'Reflected' or 'completed' once the physical card's stored-value is updated (via the Stored-Value Card Update process described in FIG. 6), thus reflecting the pending transaction (in the form of a reload) to the card.

Figure 4A:
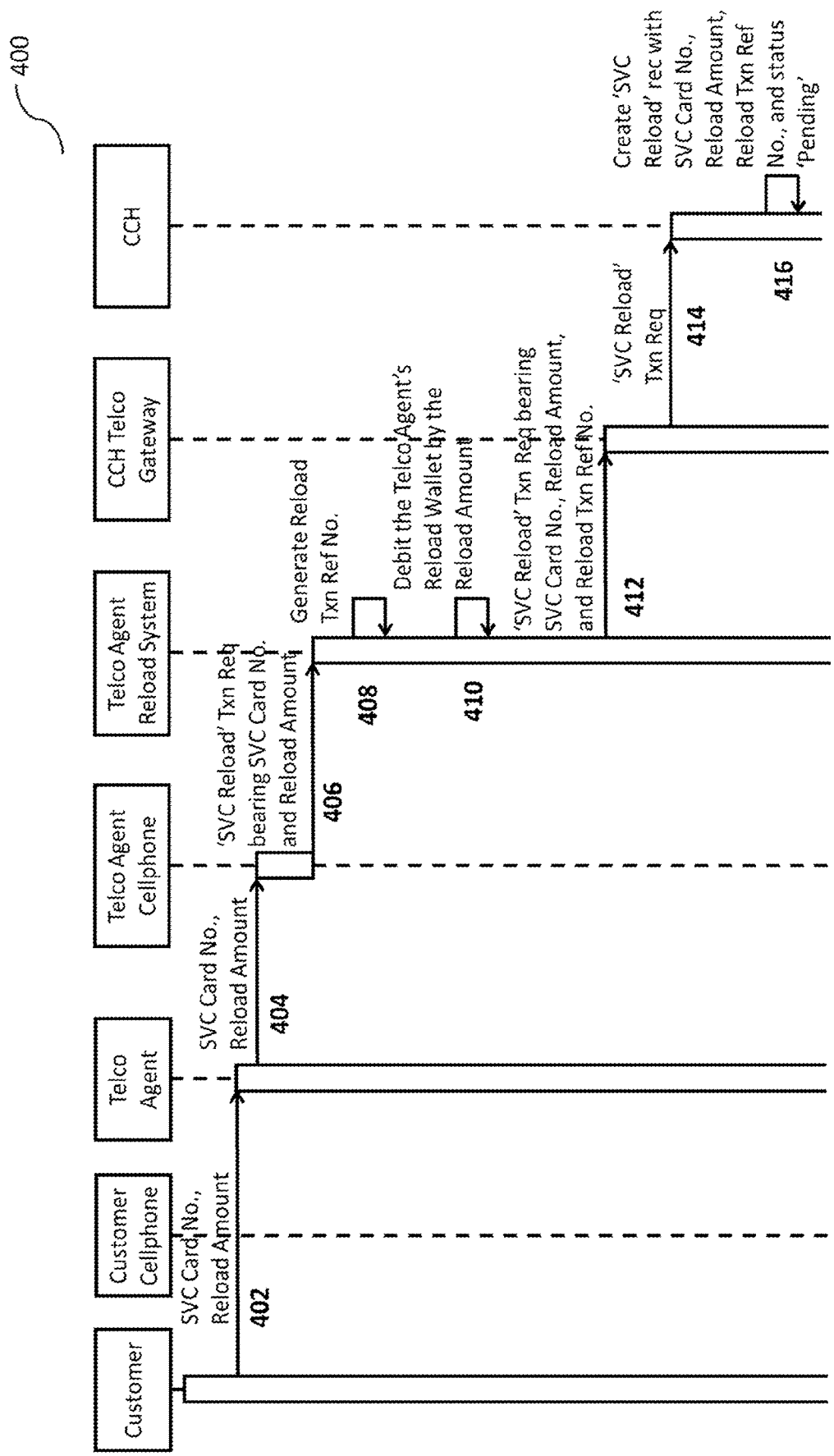
FIG. 4 illustrates the process associated with a user who sends a request for update to a telecommunications network agent.
Figure 4B:
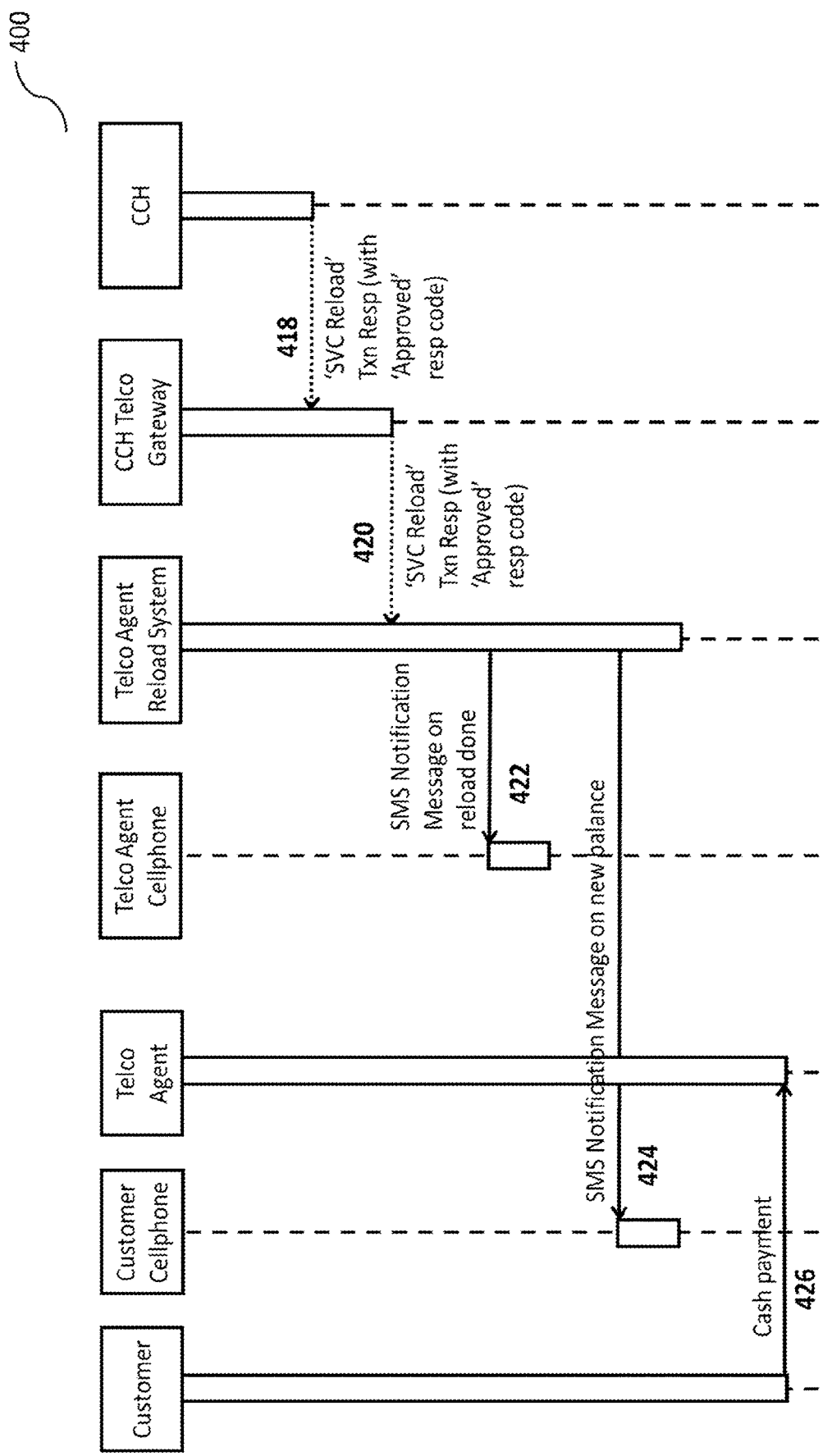
Figure 5A:
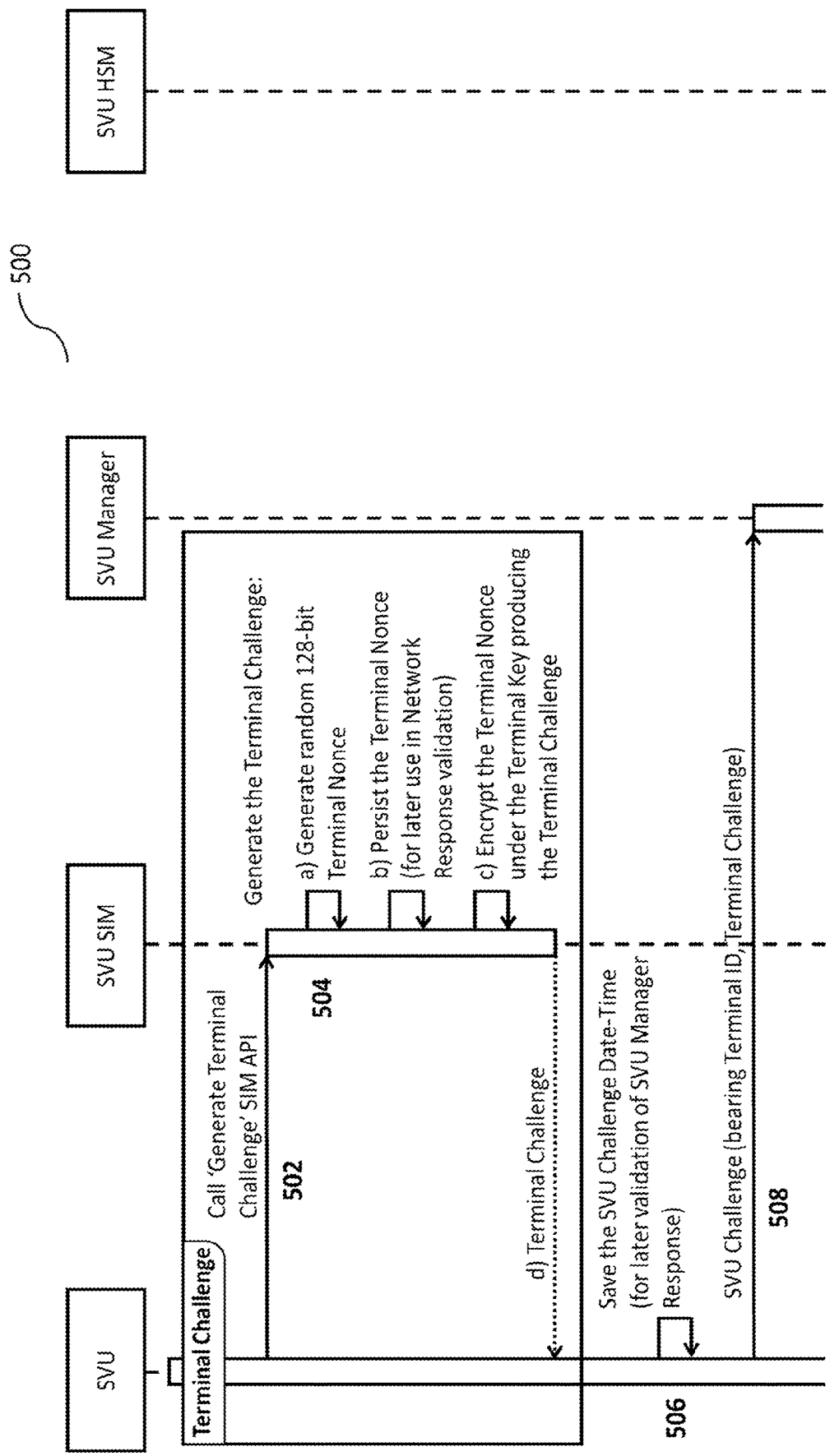
FIG. 5 illustrates the authentication process between a front-end SVU device and a backend SVU manager prior usage.
Figure 5B:
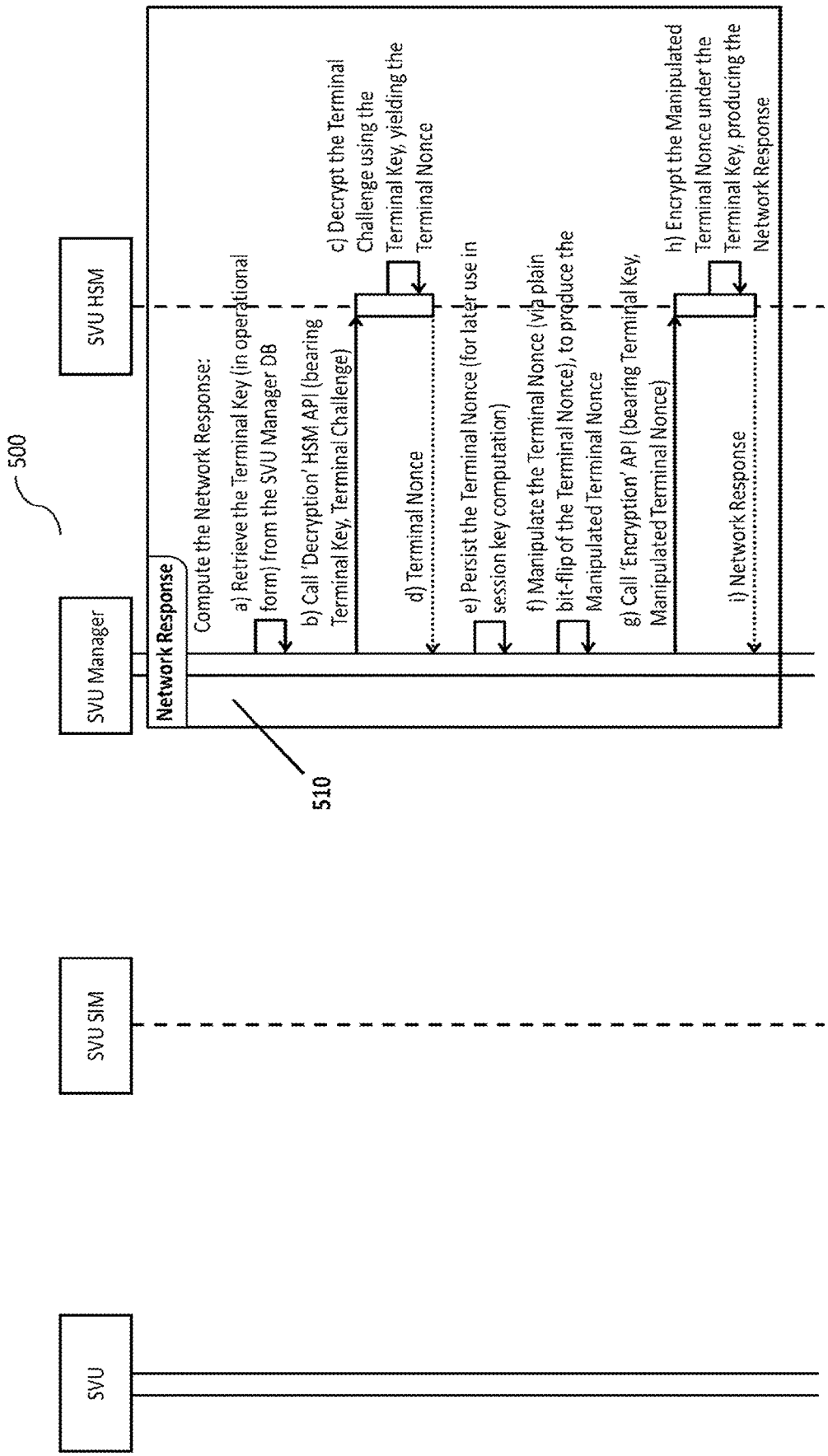
Figure 5B:
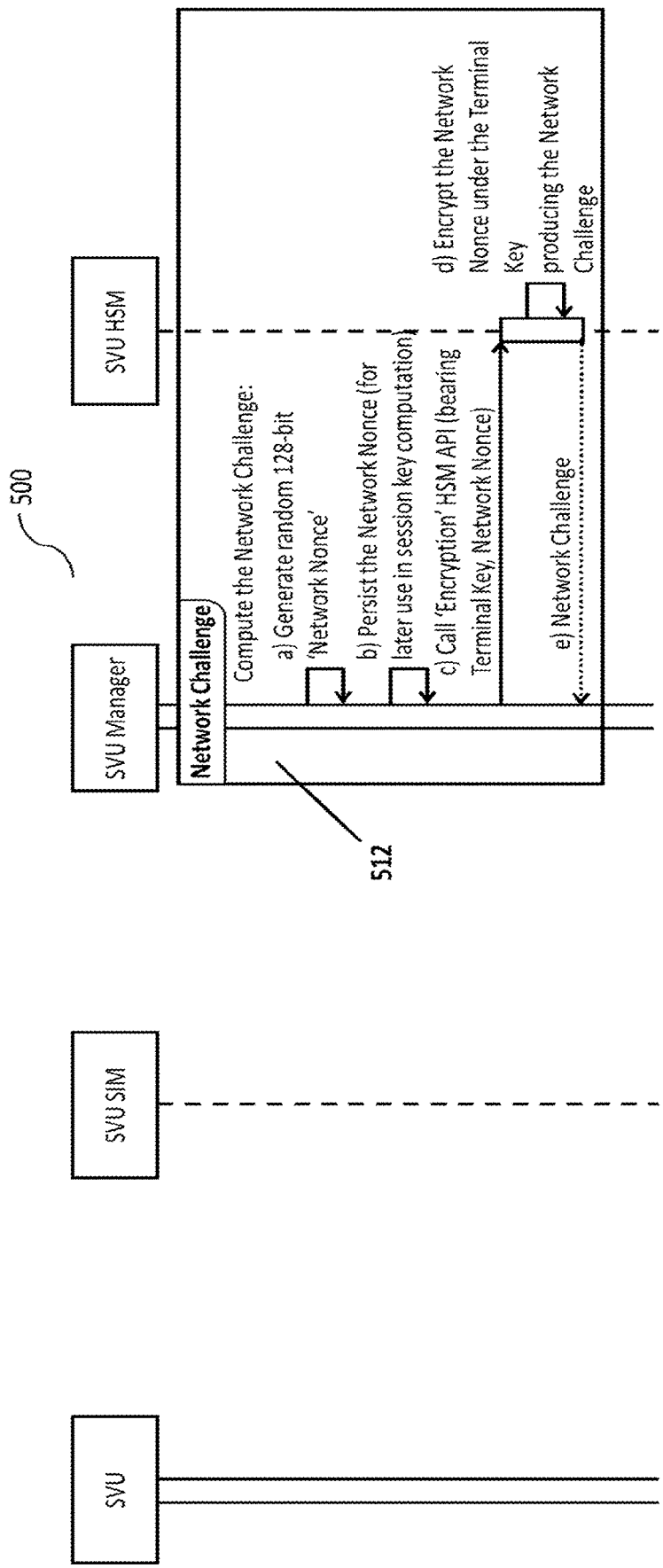
Figure 5C:
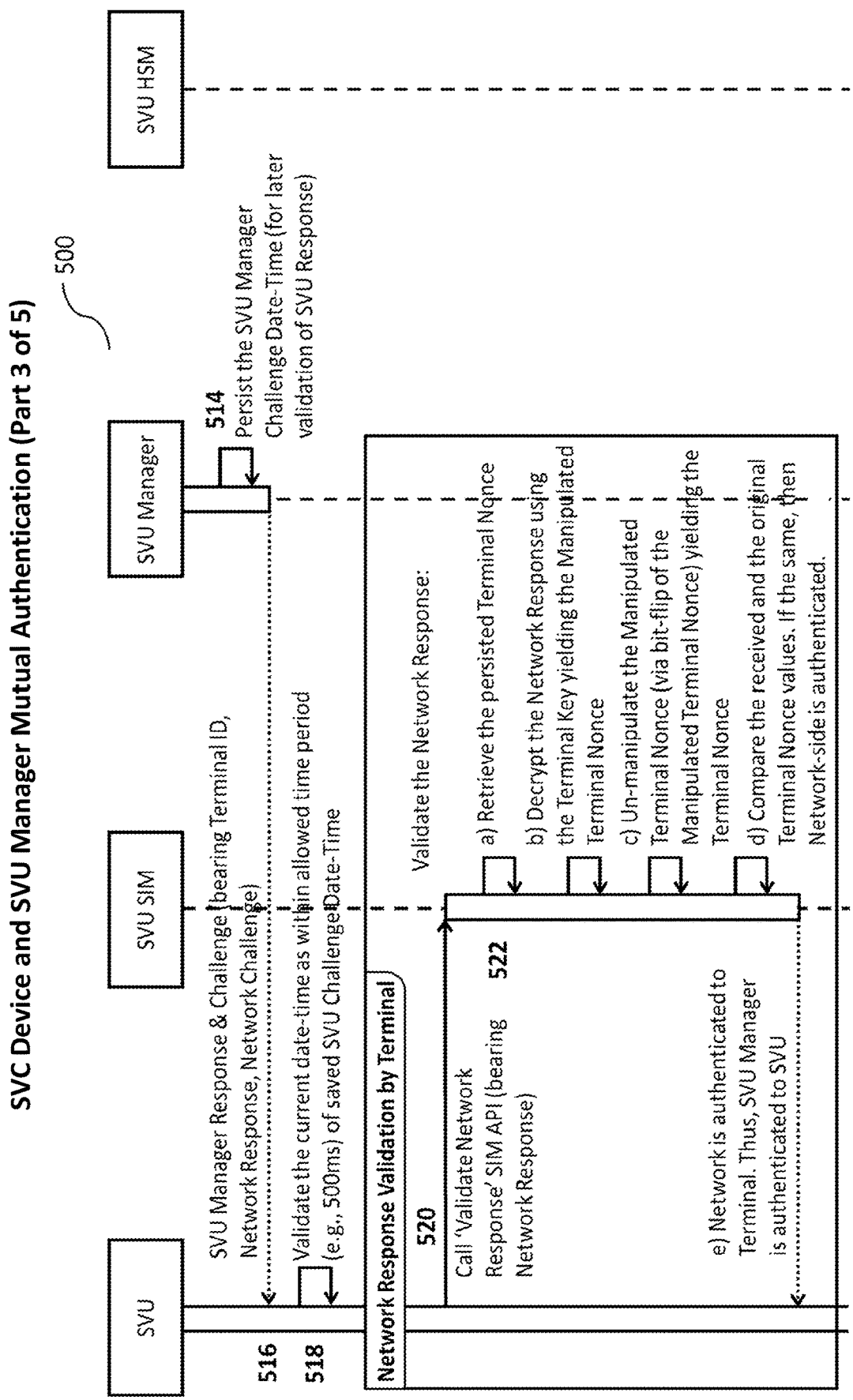
Figure 5D:
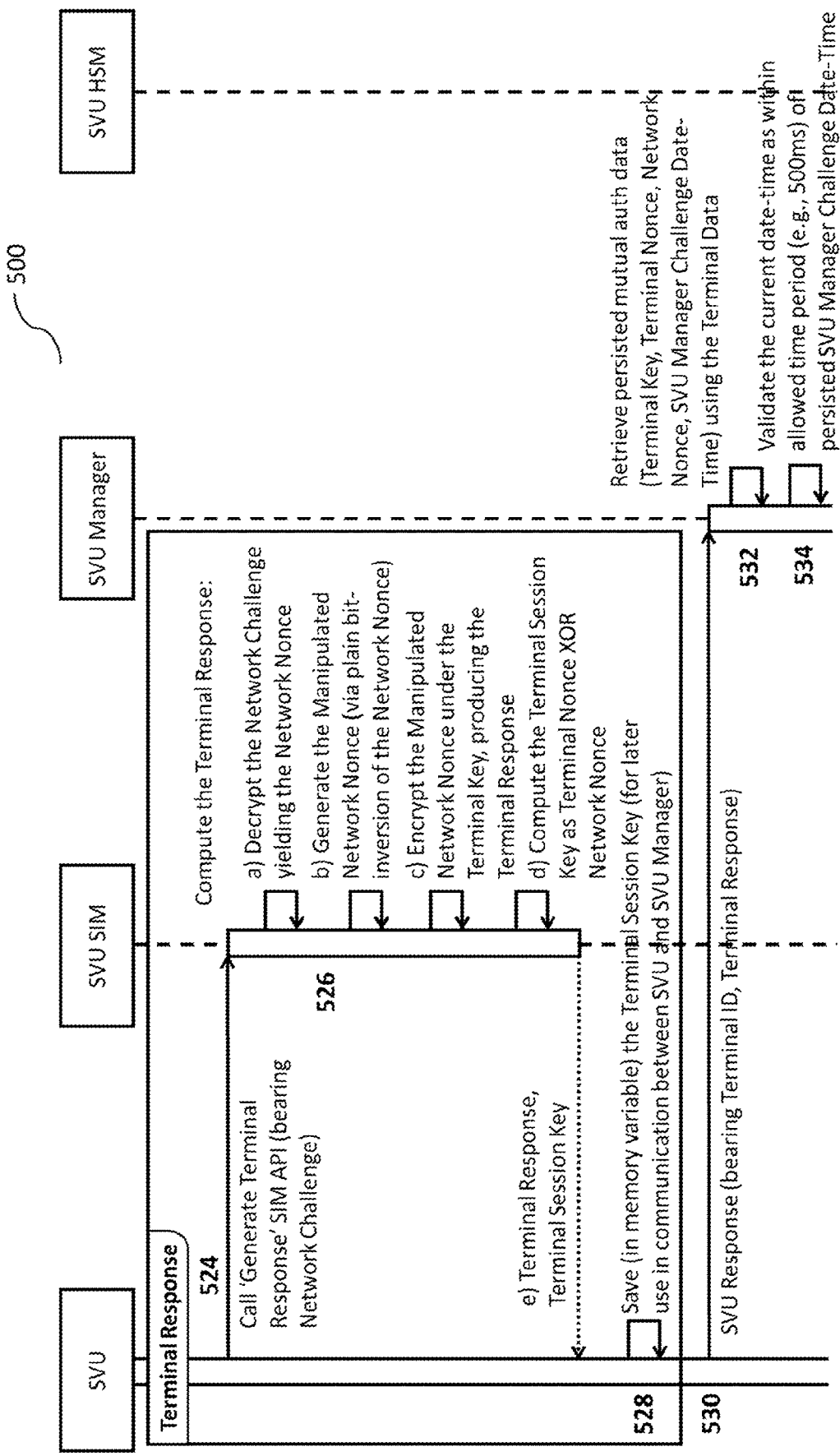
Figure 5E:
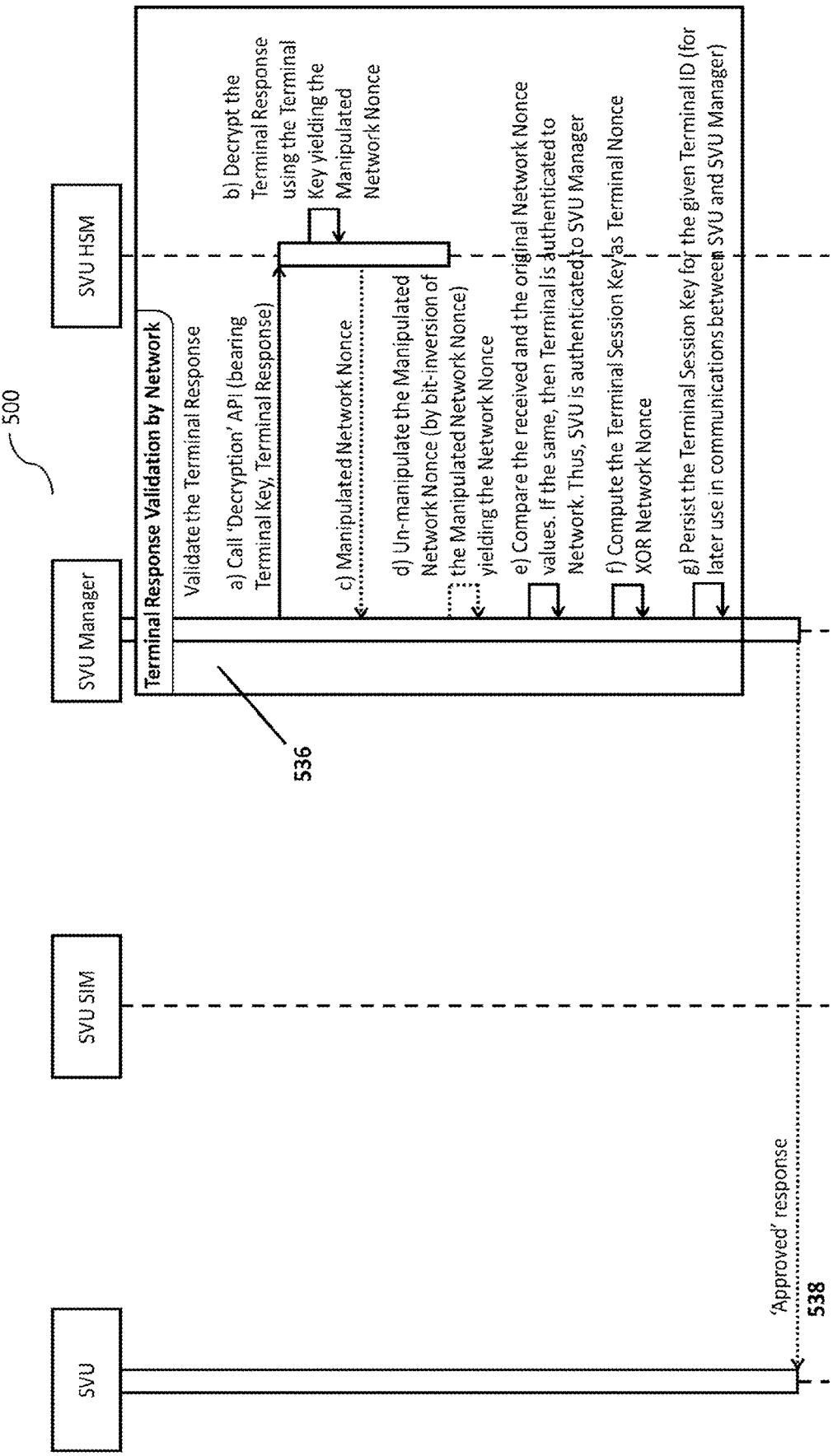
Figure 6A:
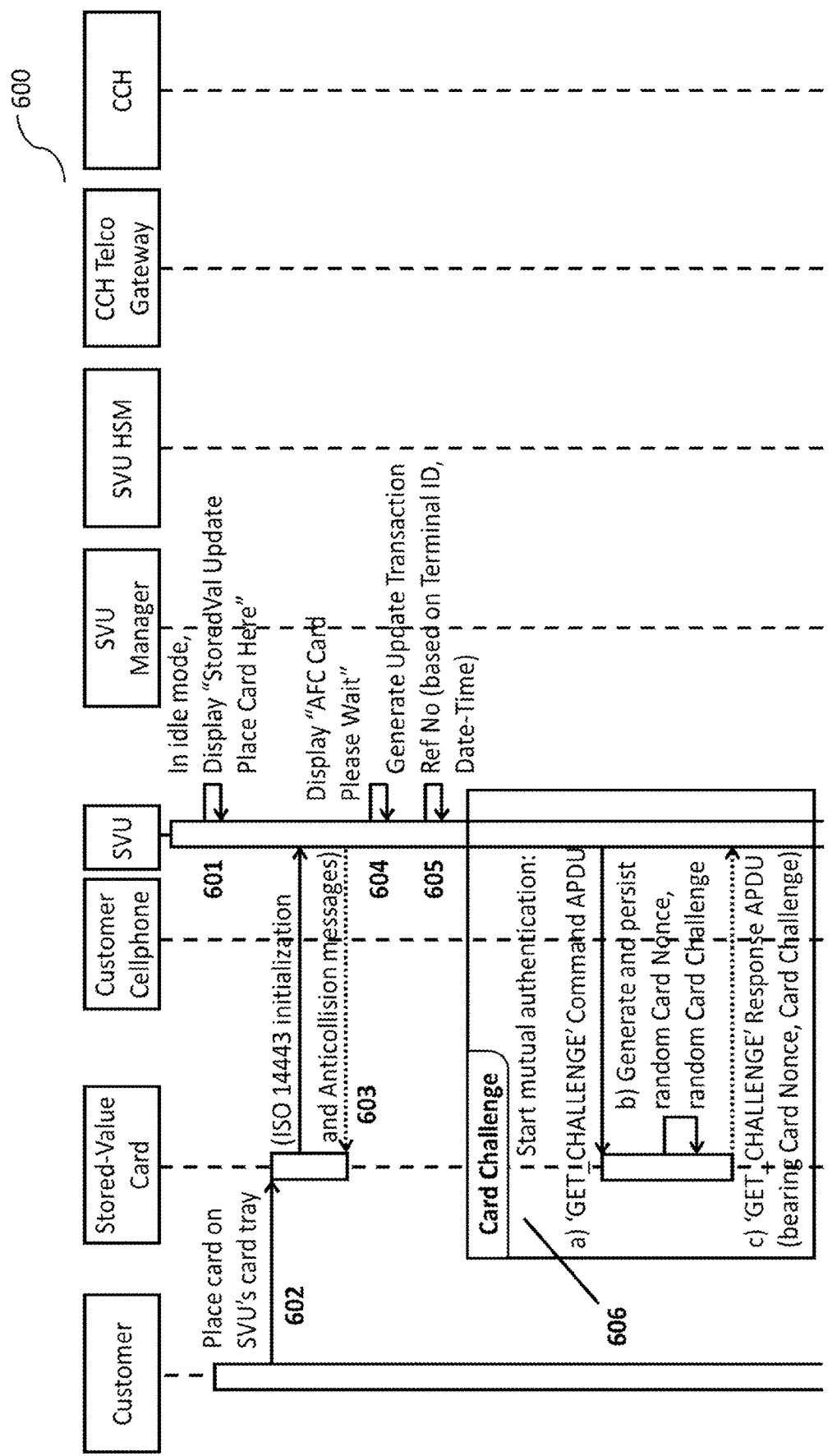
FIG. 6 illustrates the process associated with the reload or top-up of a stored value card via the SVU device after the request for reload or top-up was sent as illustrated in FIG. 4.
Figure 6A:
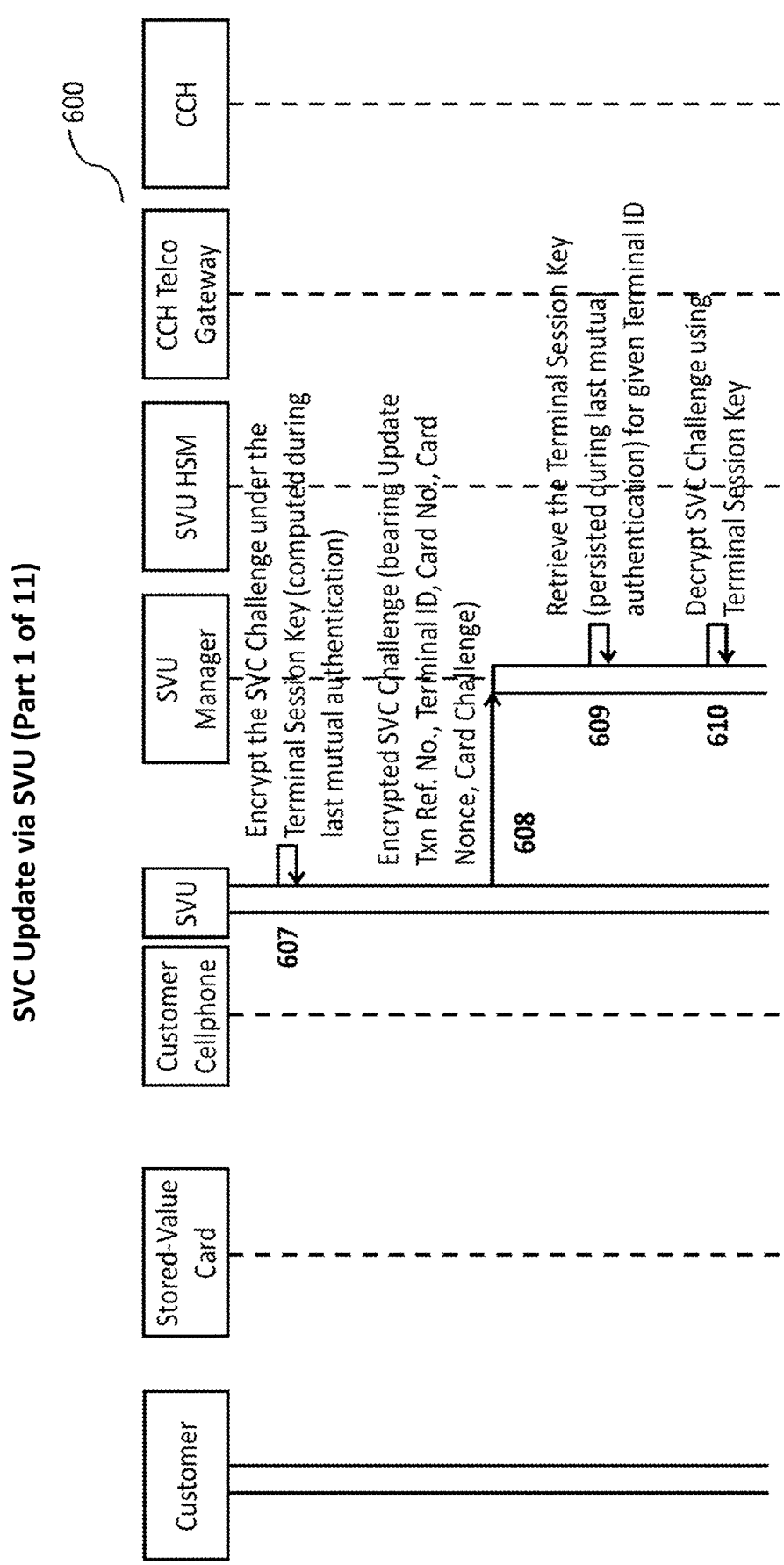
Figure 6B:
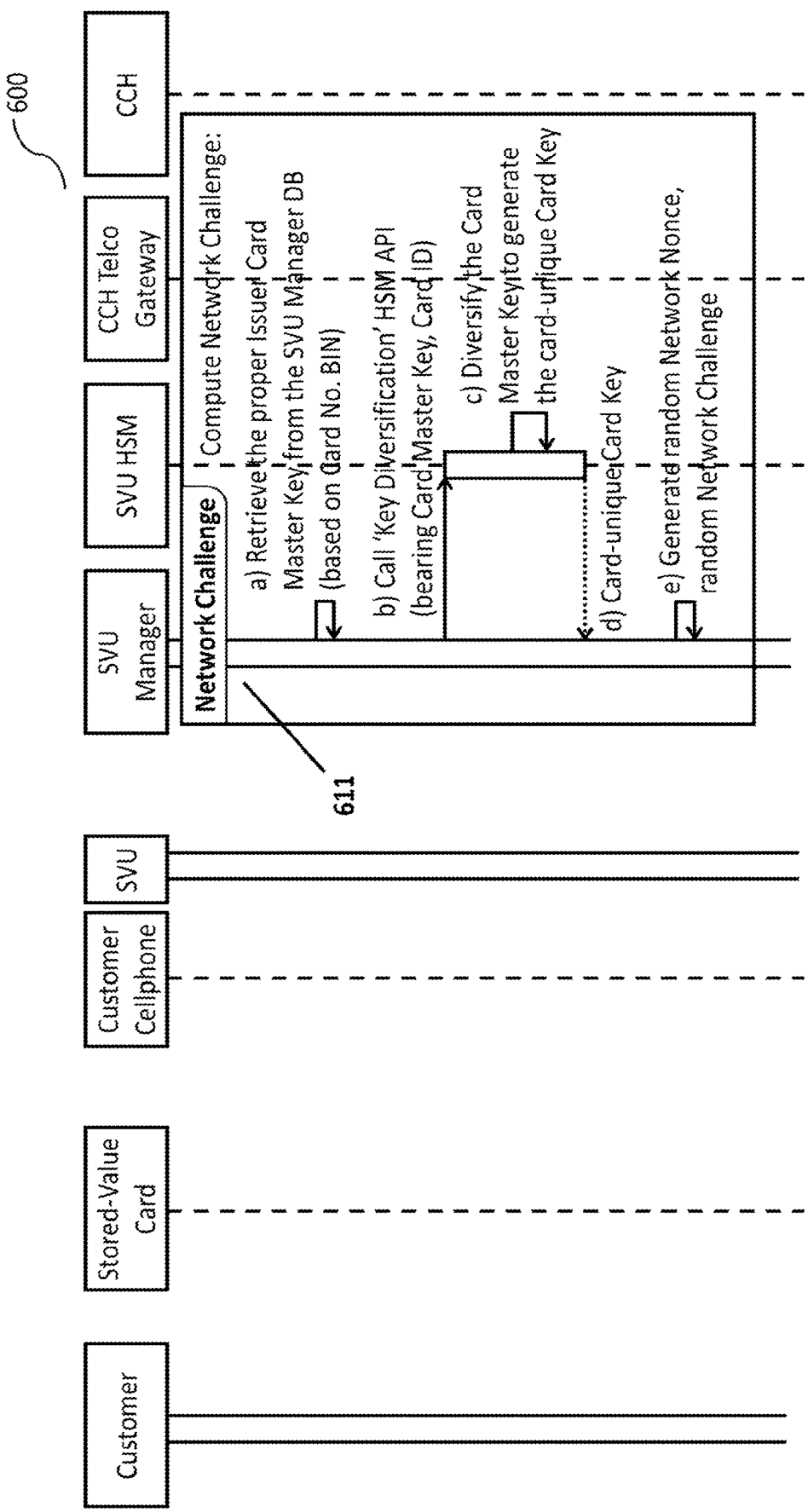
Figure 6B:
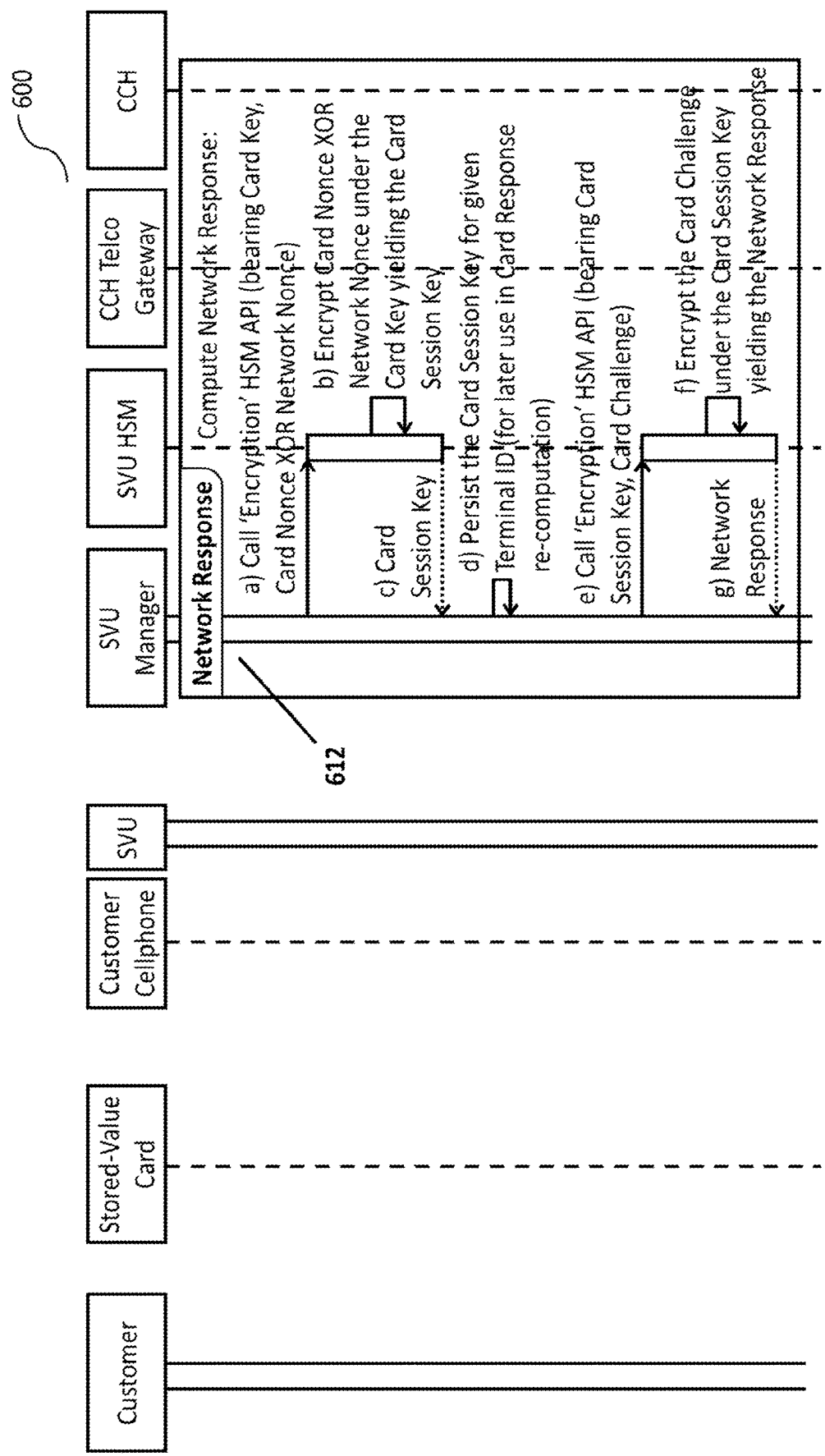
Figure 6C:
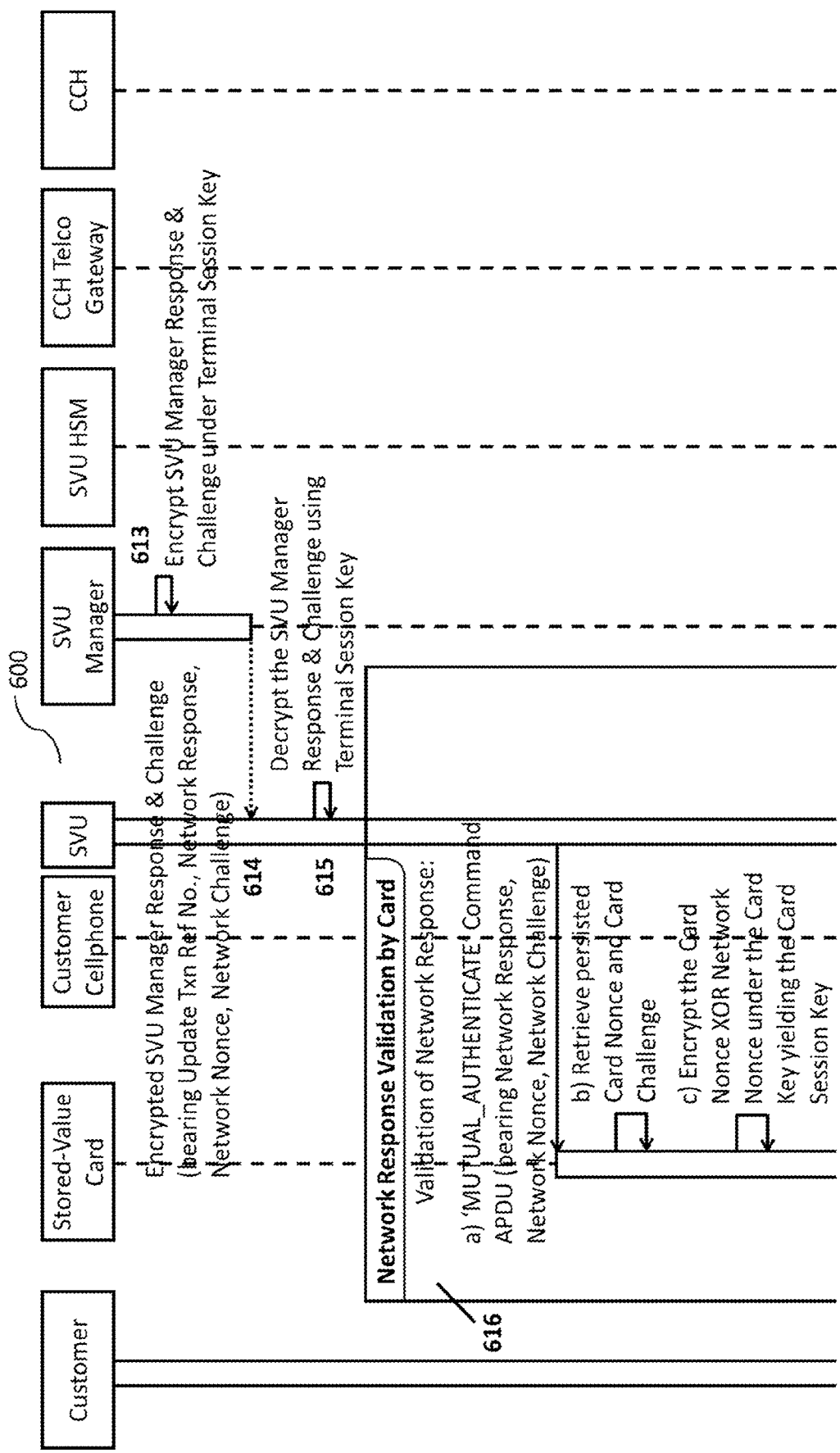
Figure 6C:
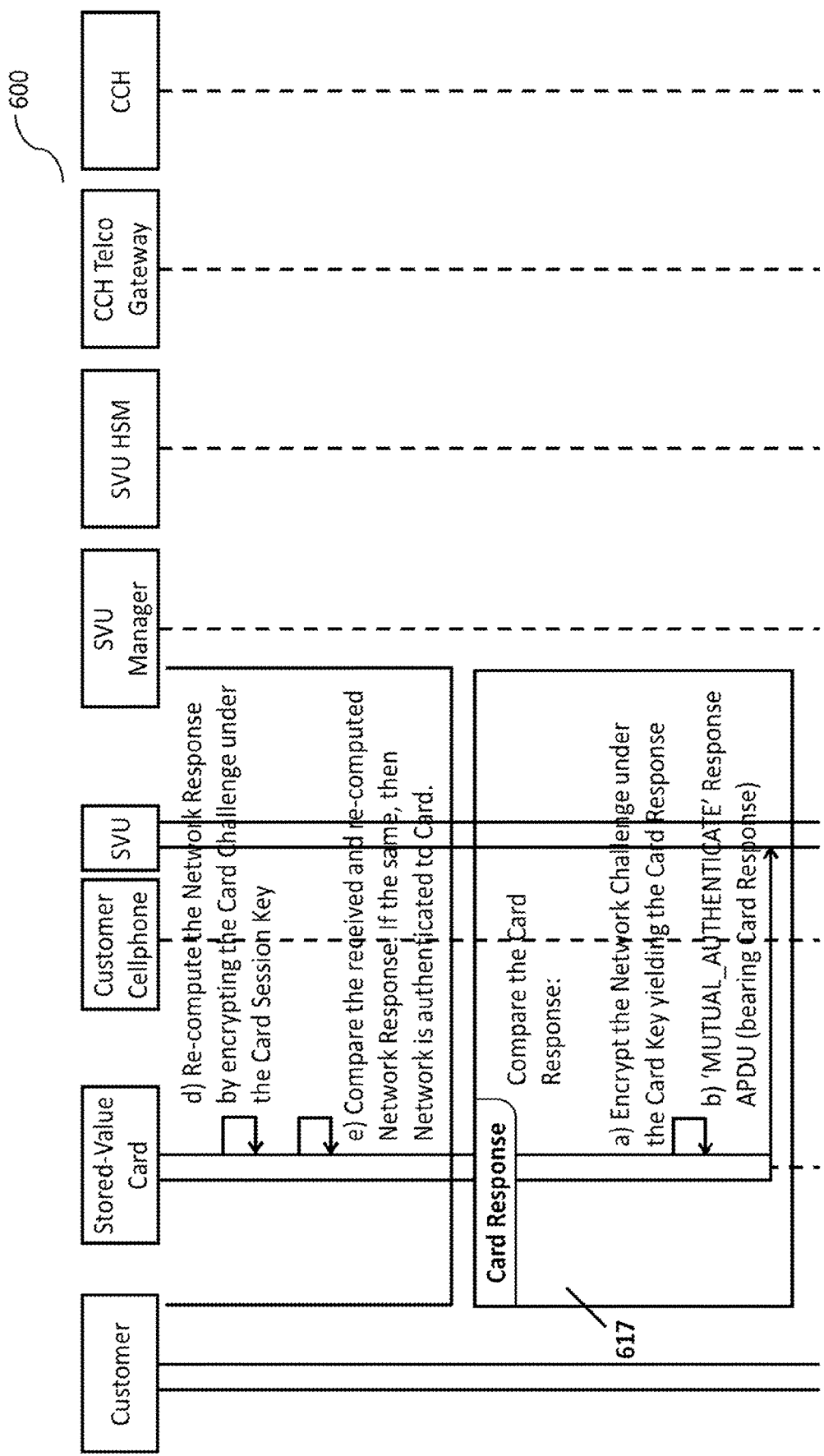
Figure 6D:
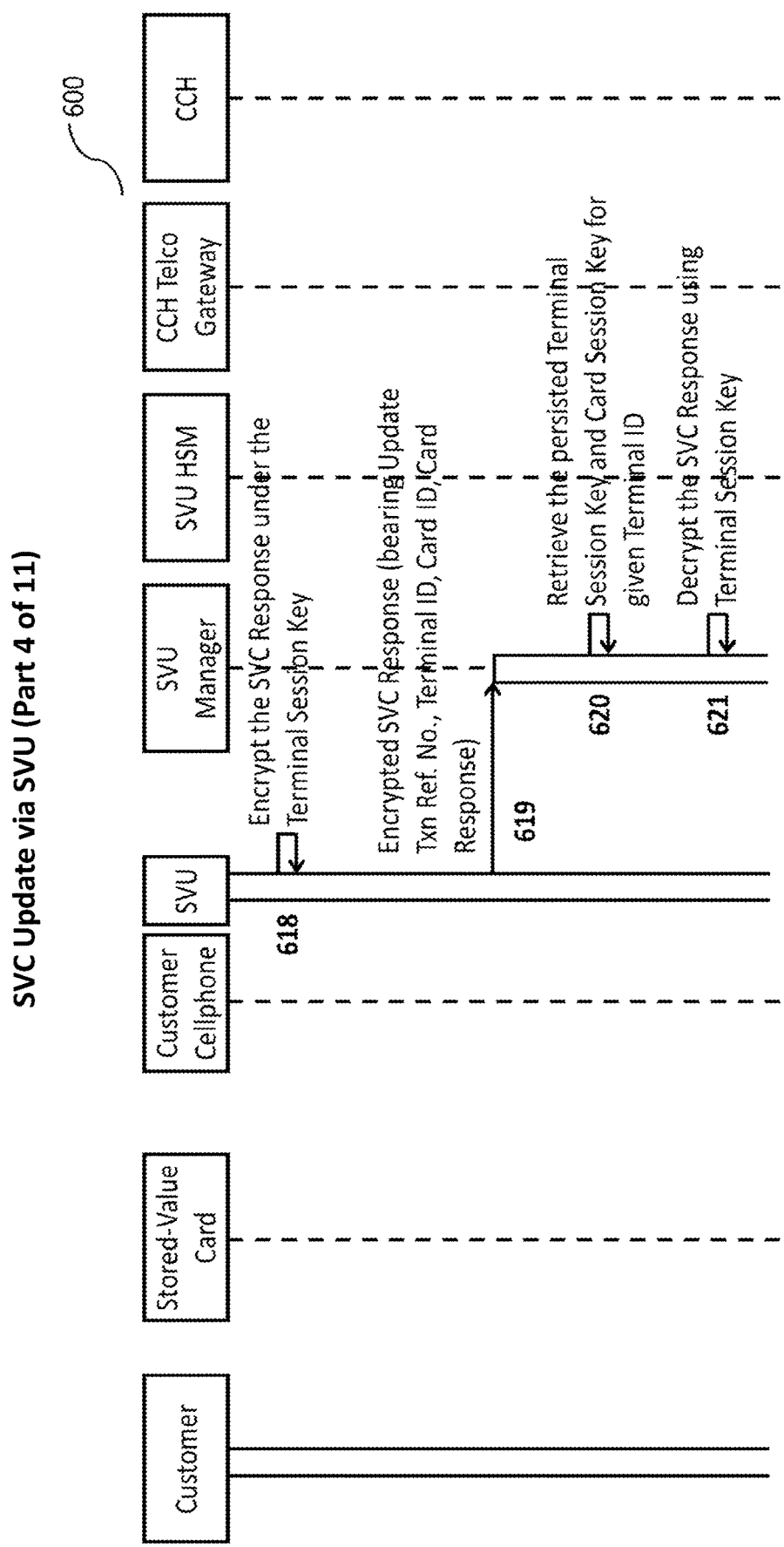
Figure 6D:
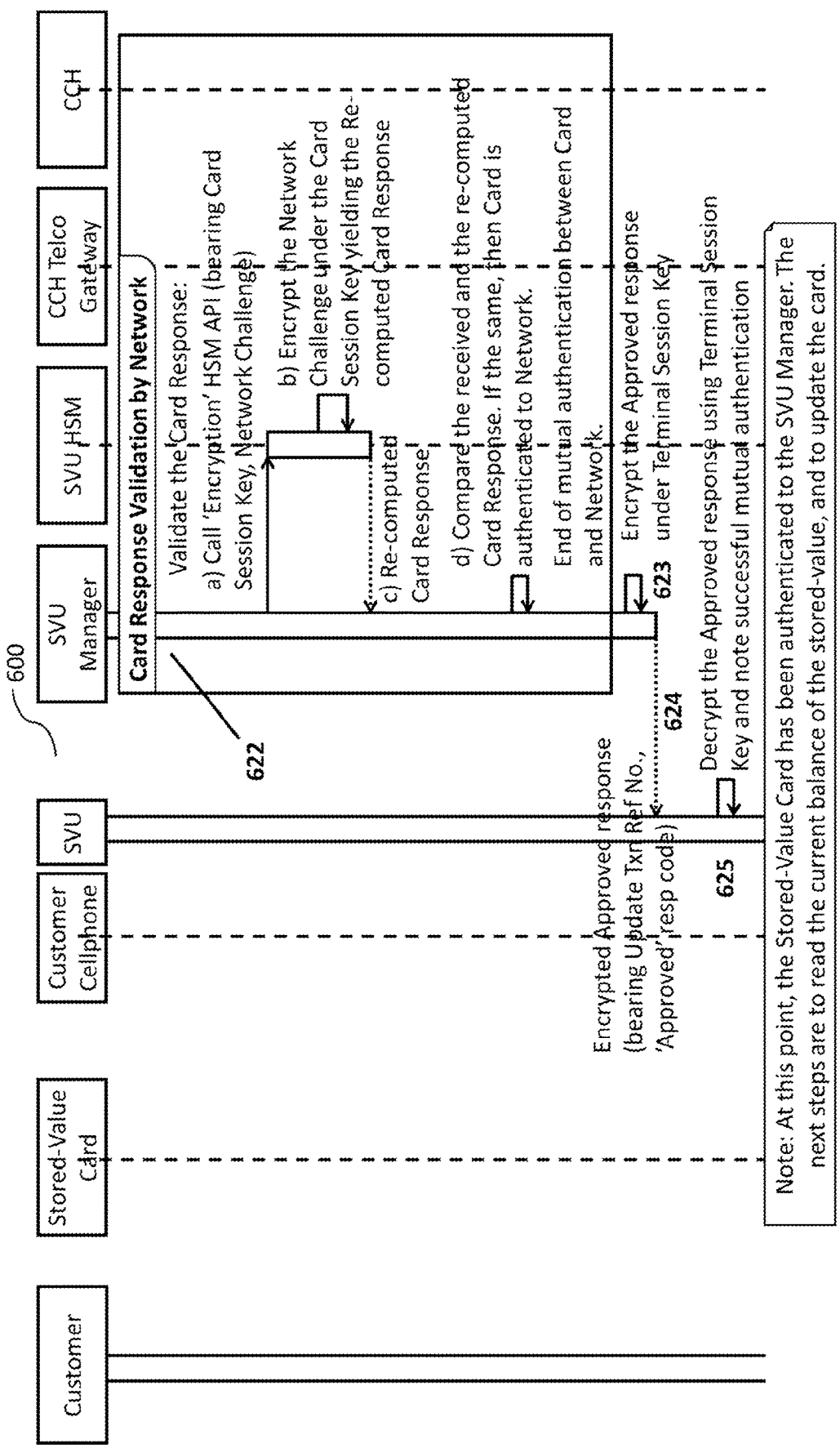
Figure 6E:
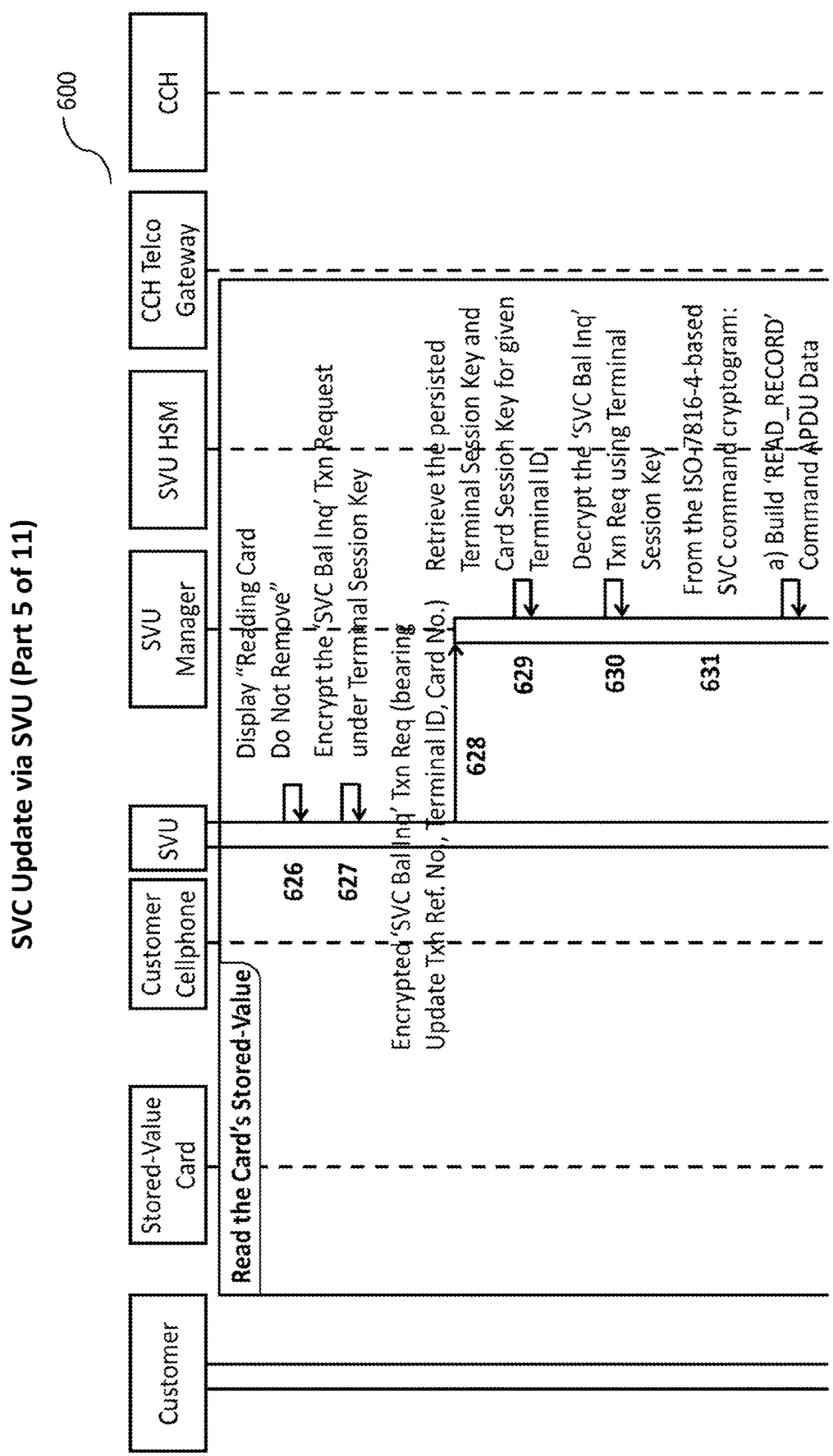
Figure 6E:
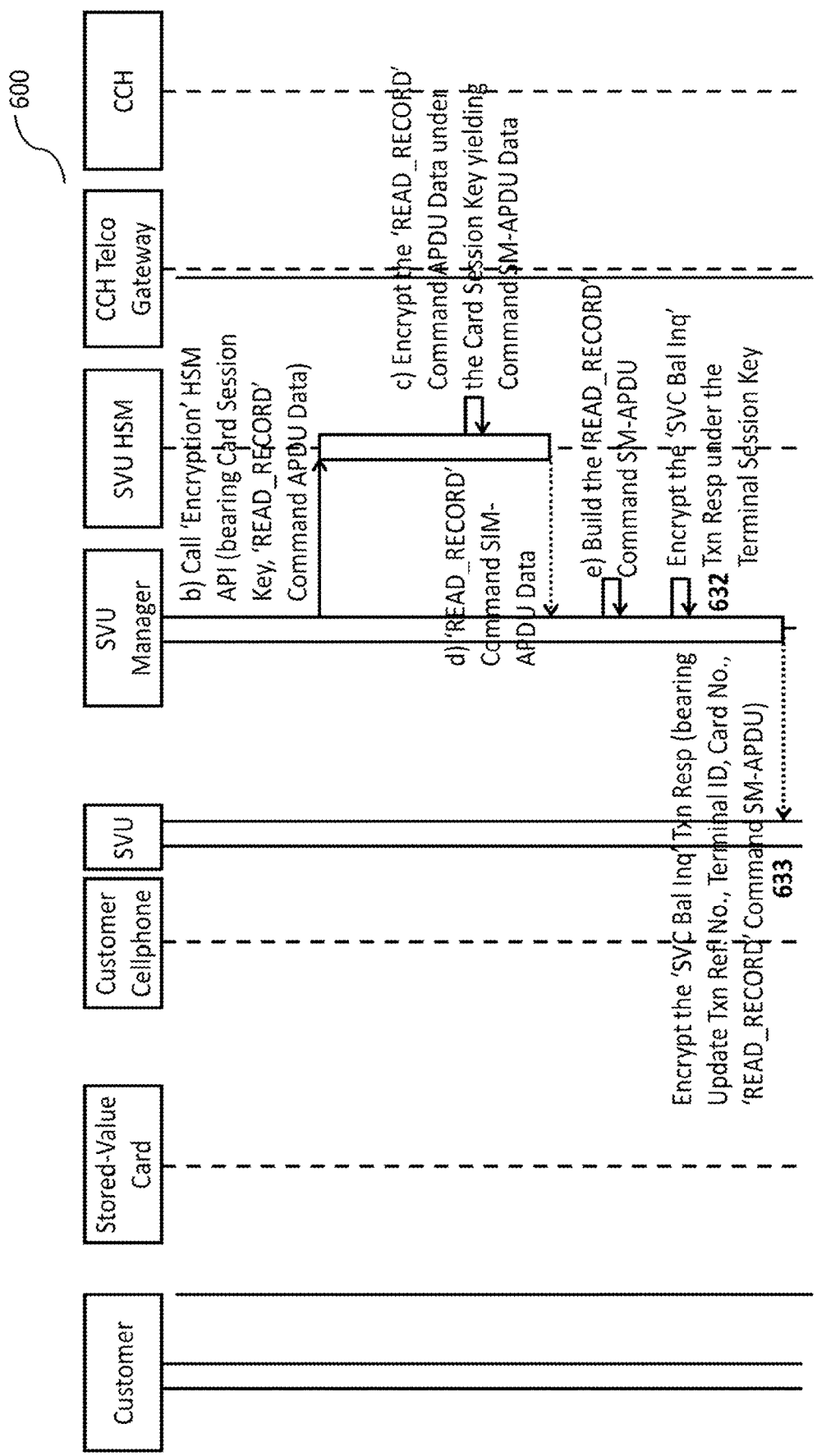
Figure 6F:
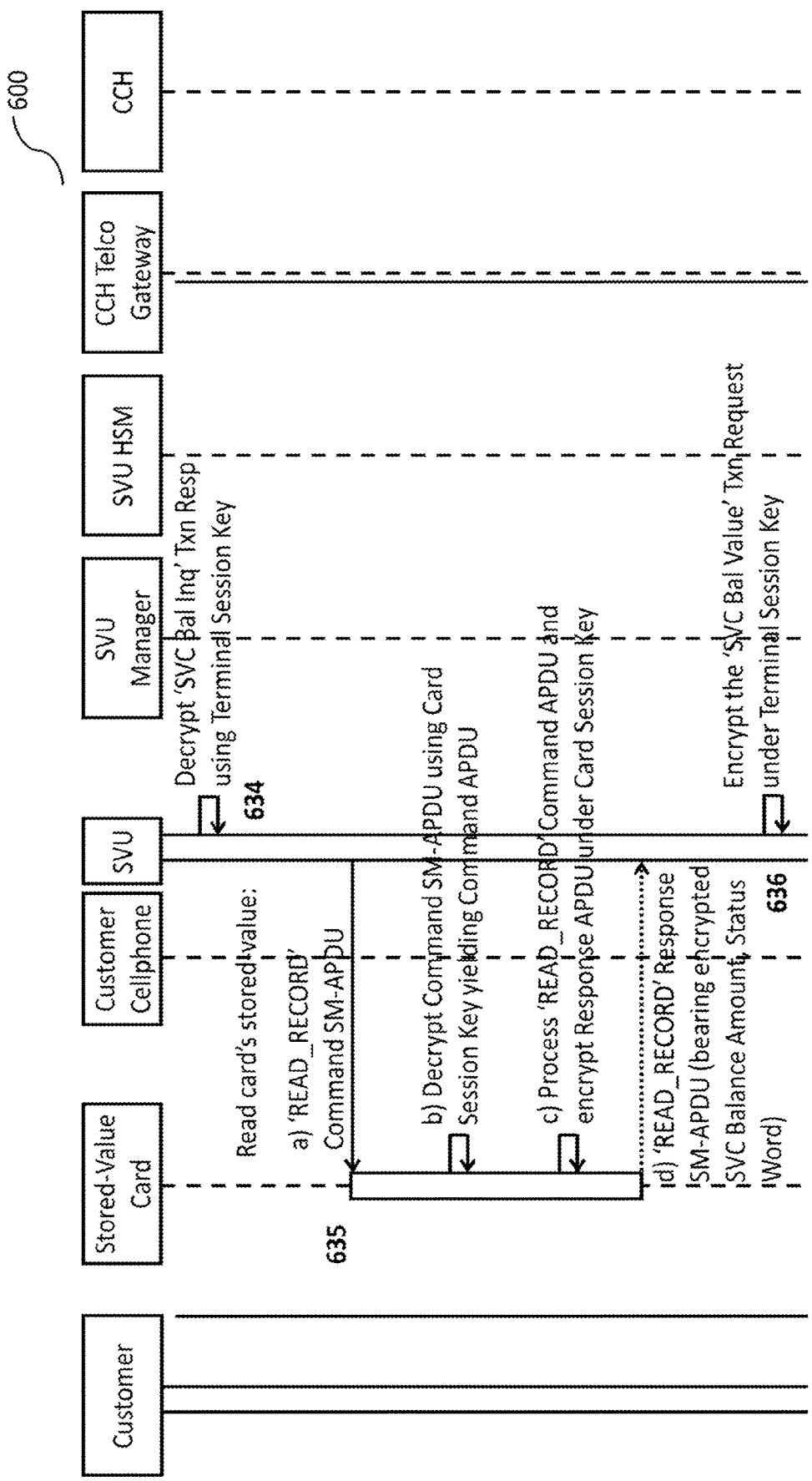
Figure 6F:
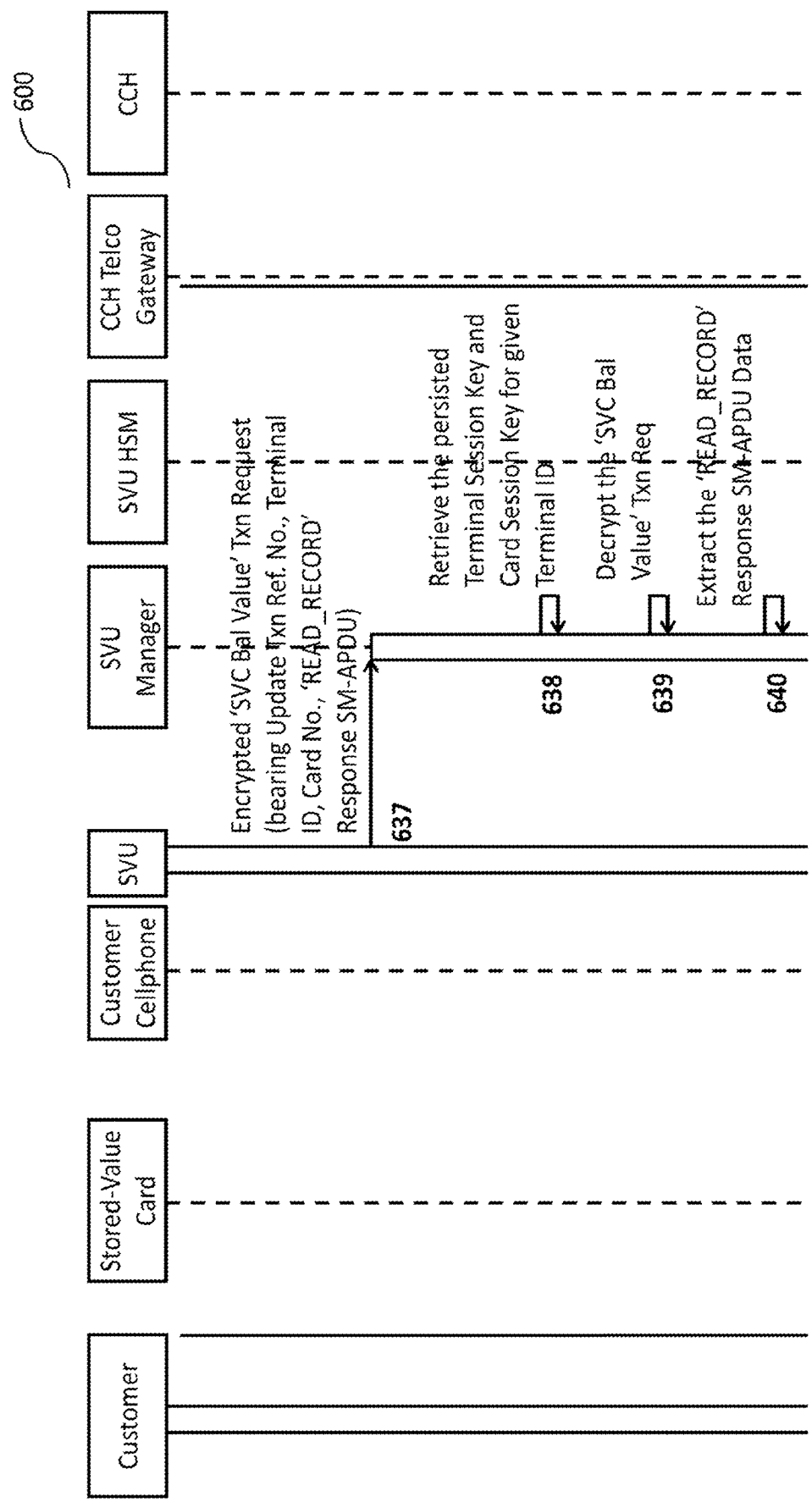
Figure 6G:
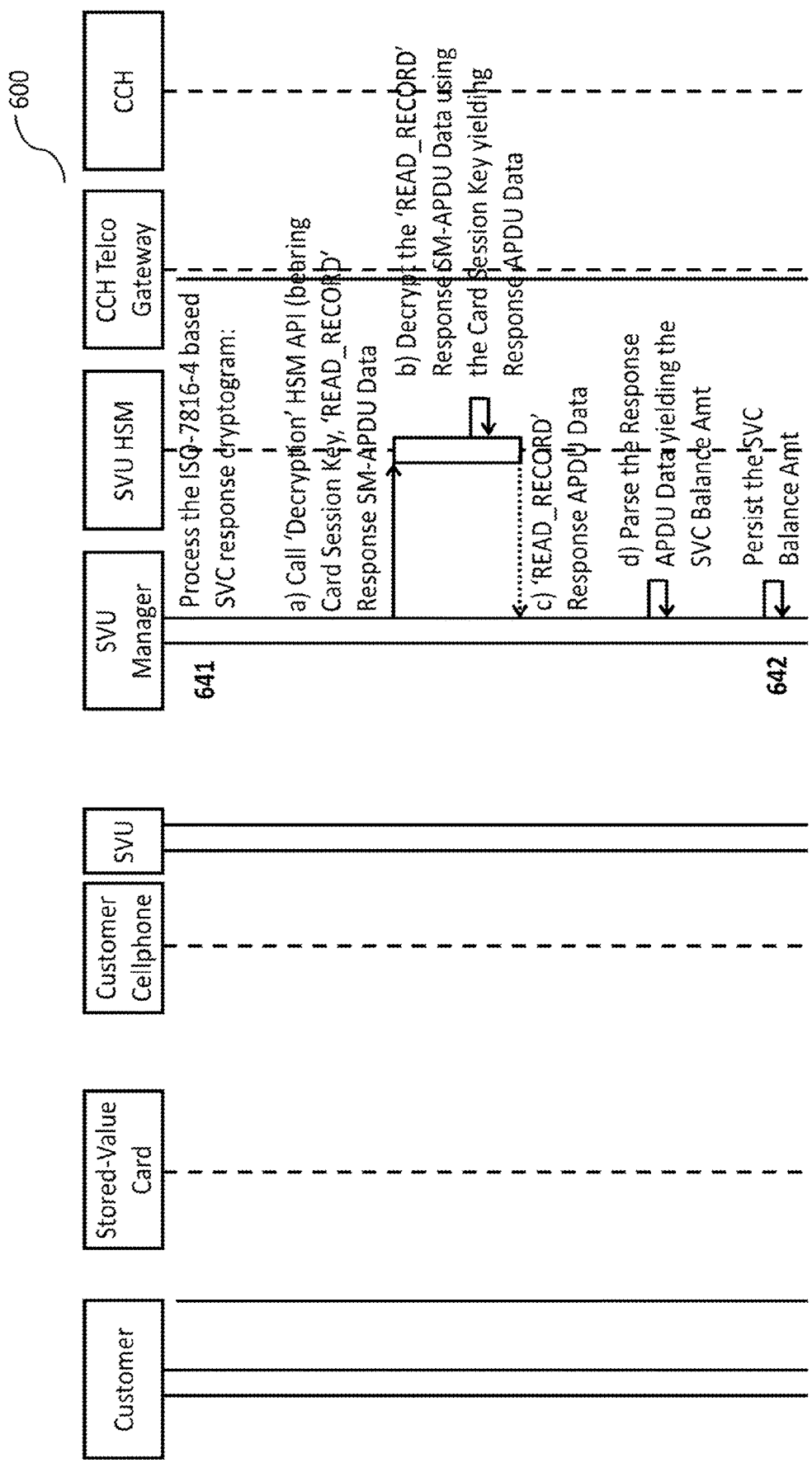
Figure 6G:
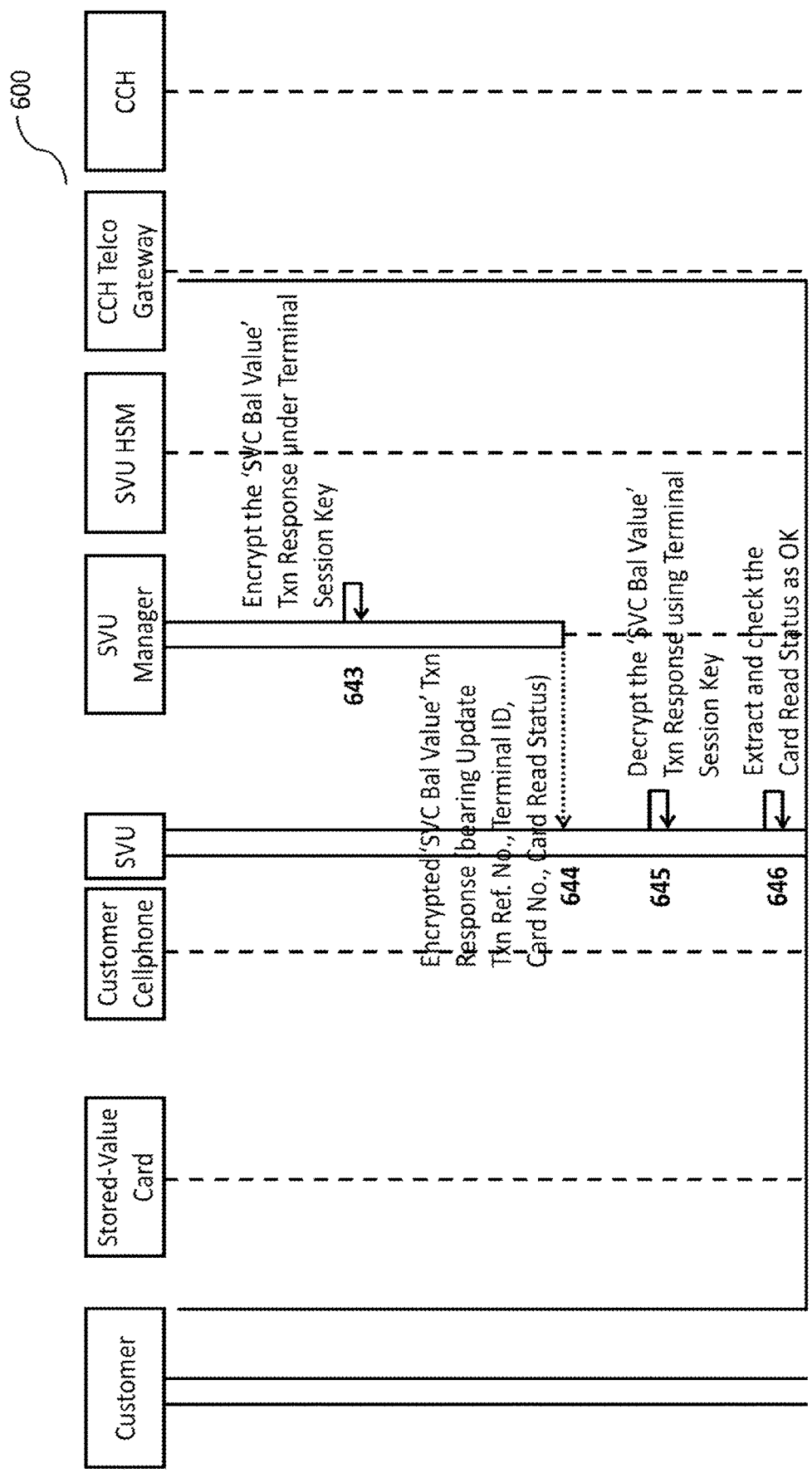
Figure 6H:
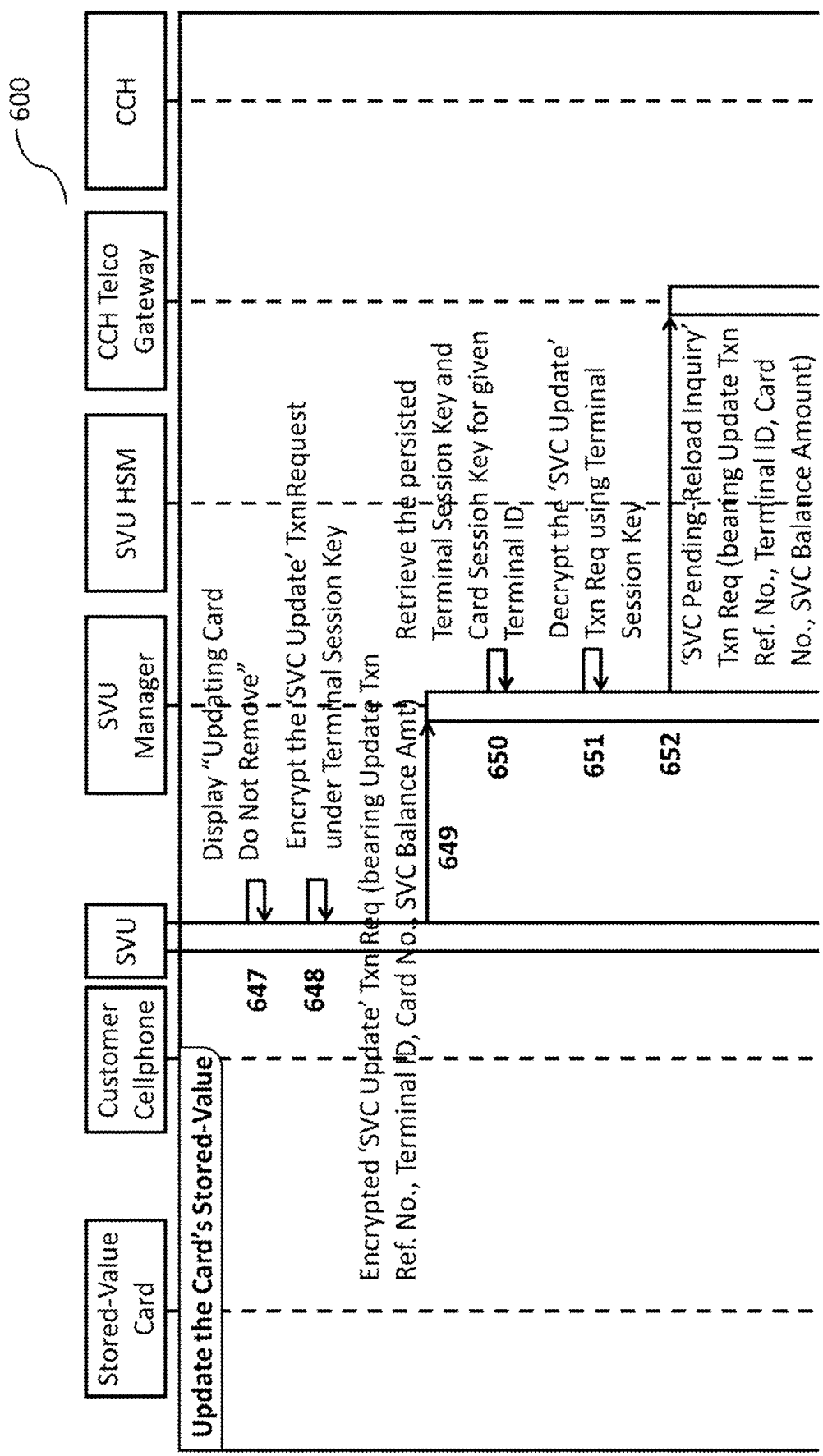
Figure 6H:
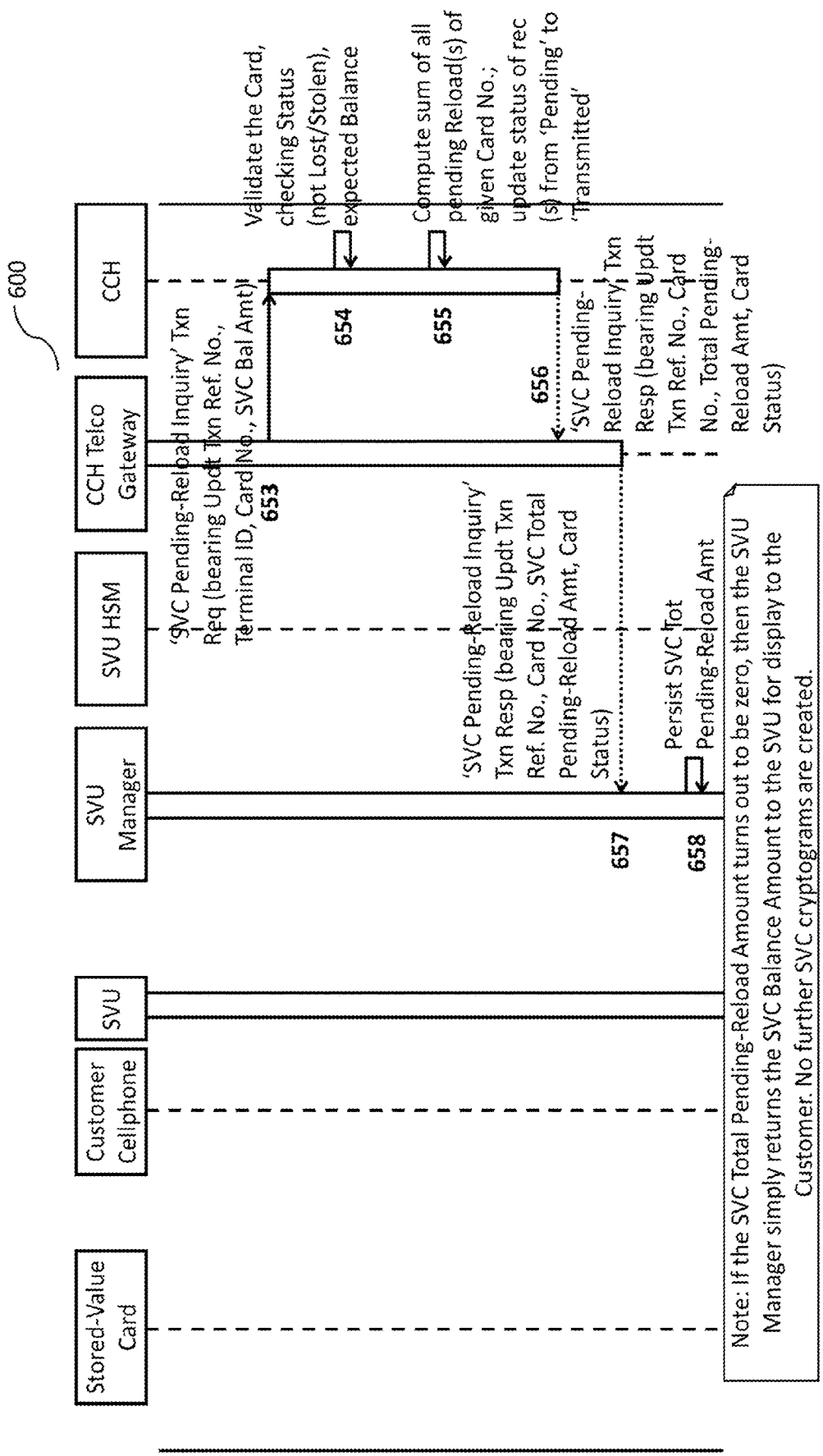
Figure 6I:
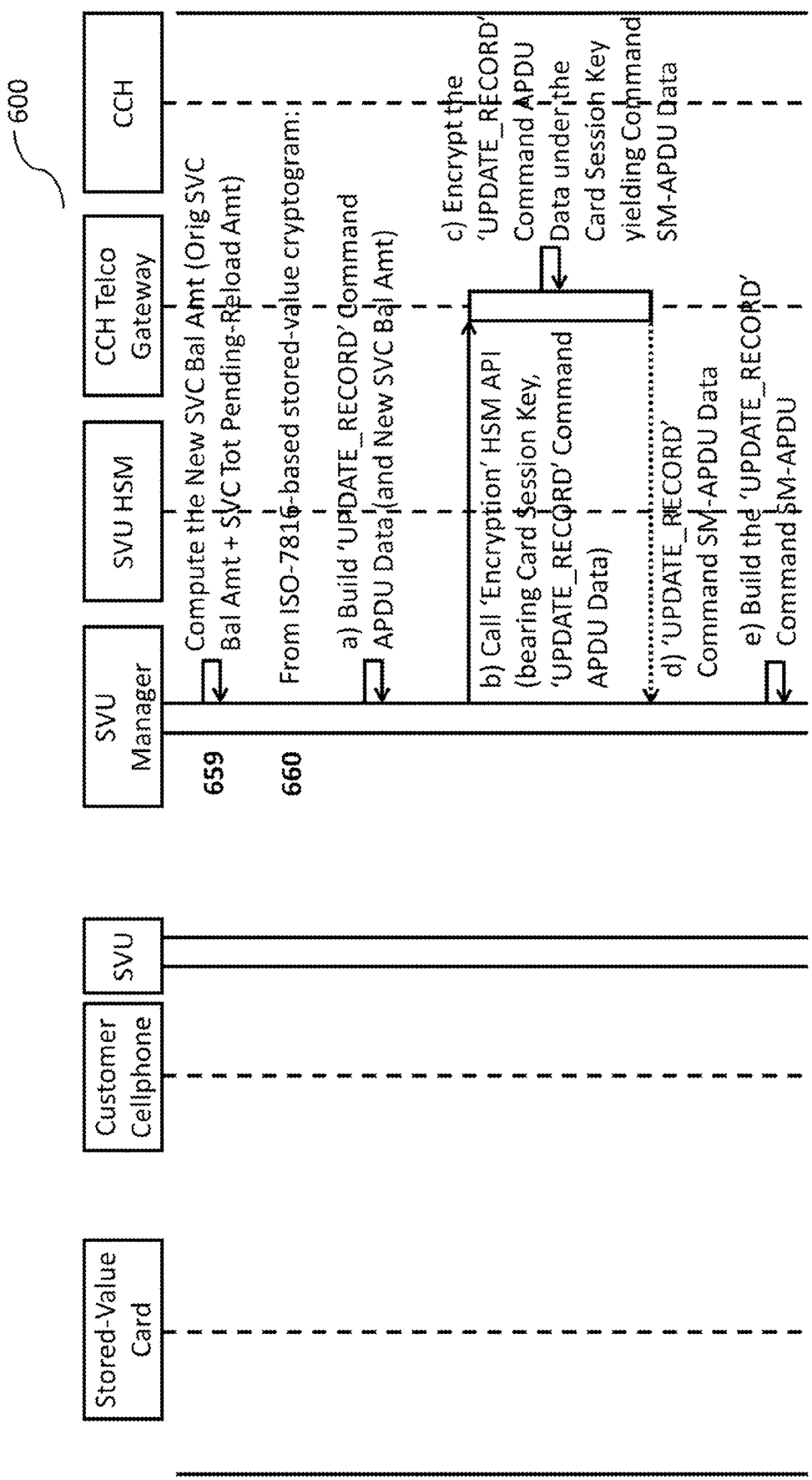
Figure 6I:
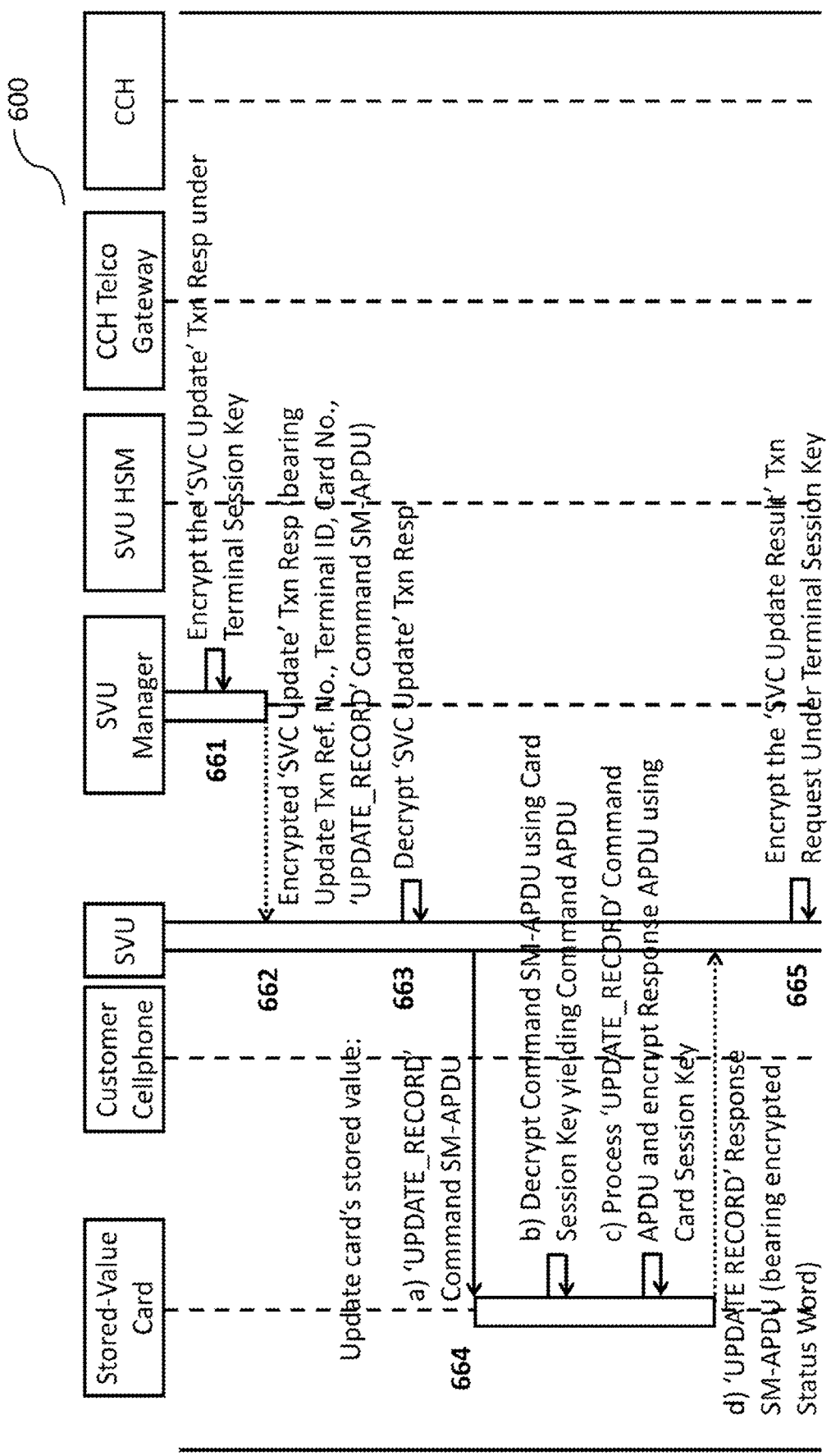
Figure 6J:
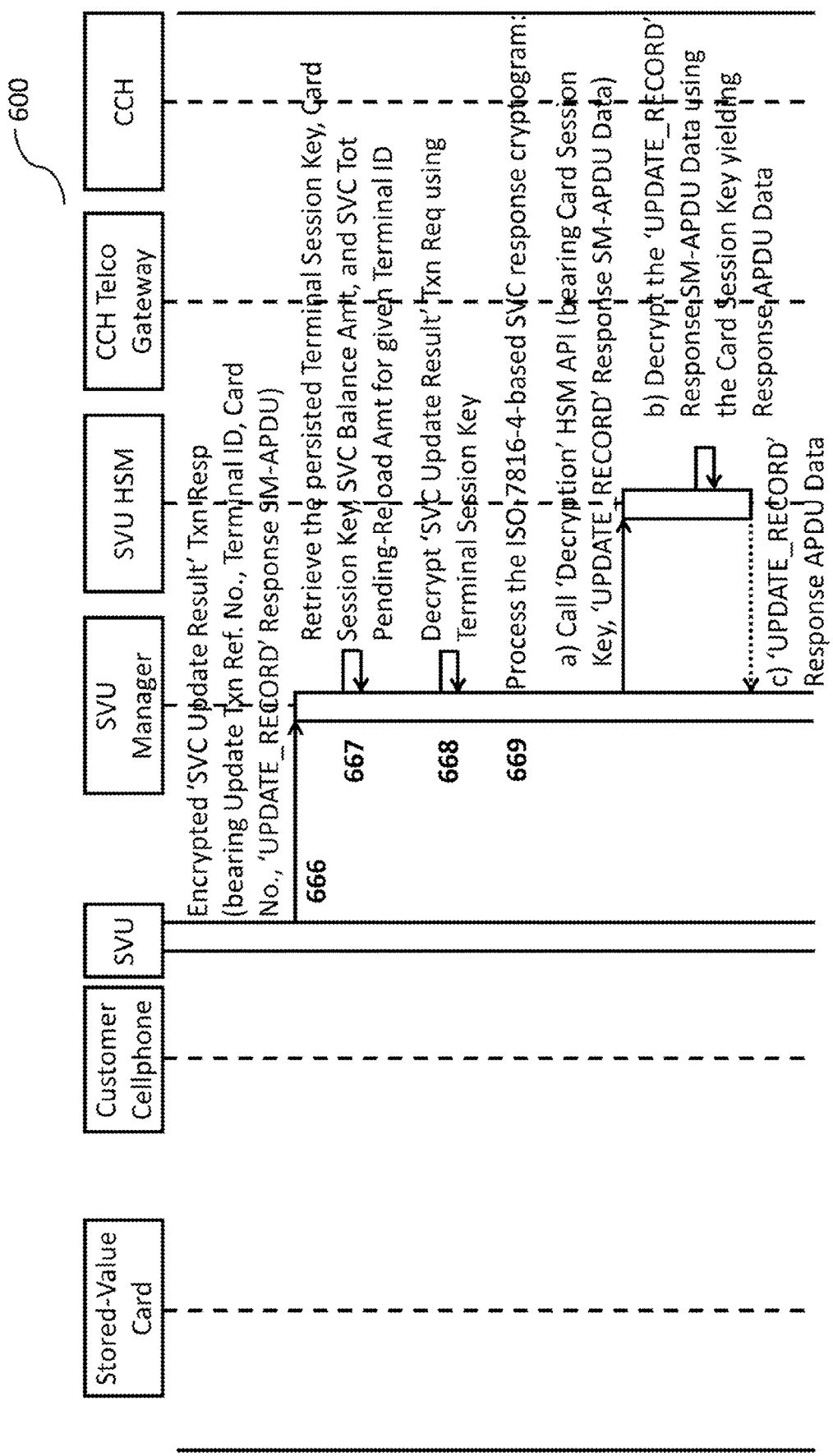
Figure 6J:
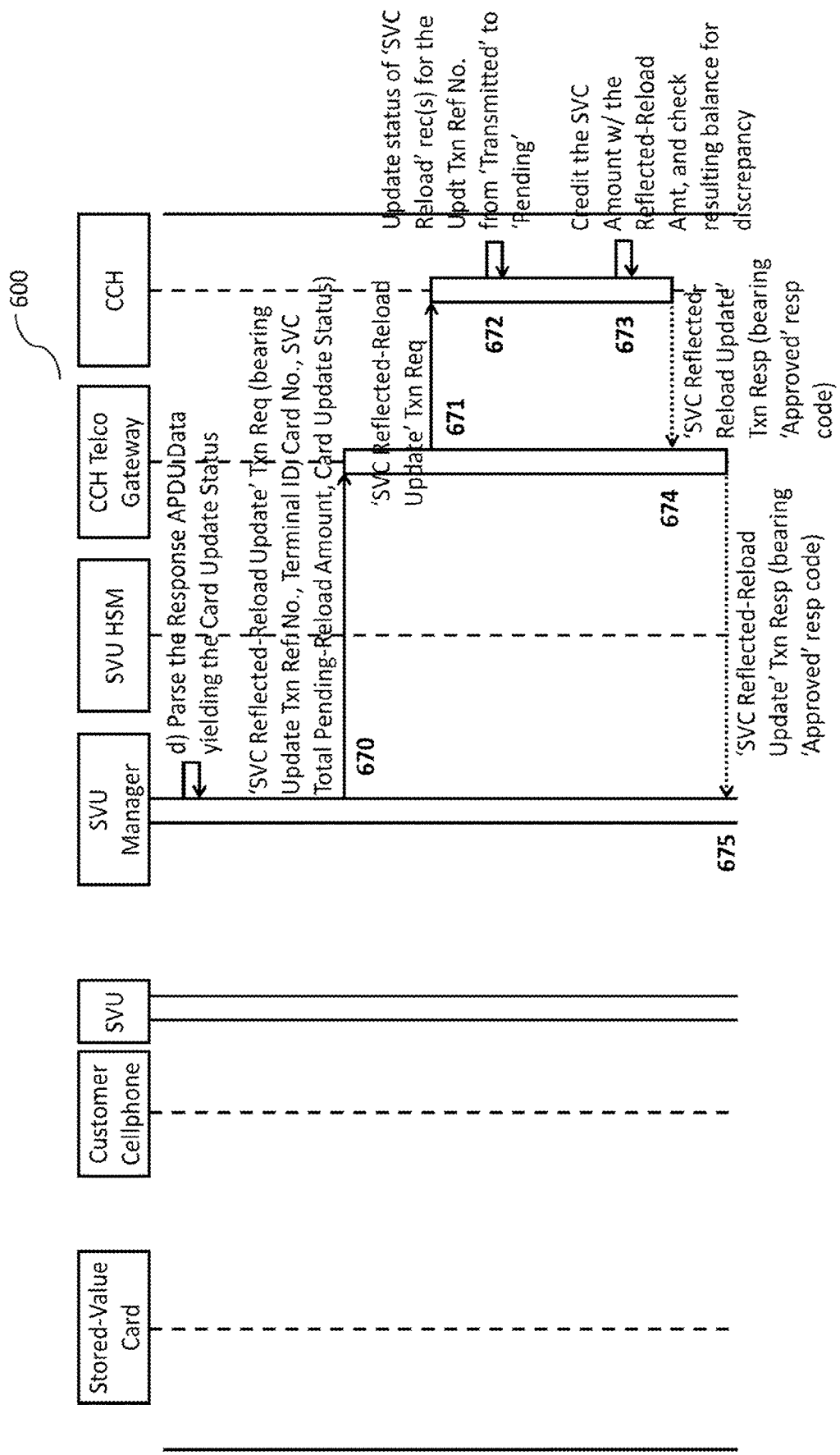
Figure 6K:
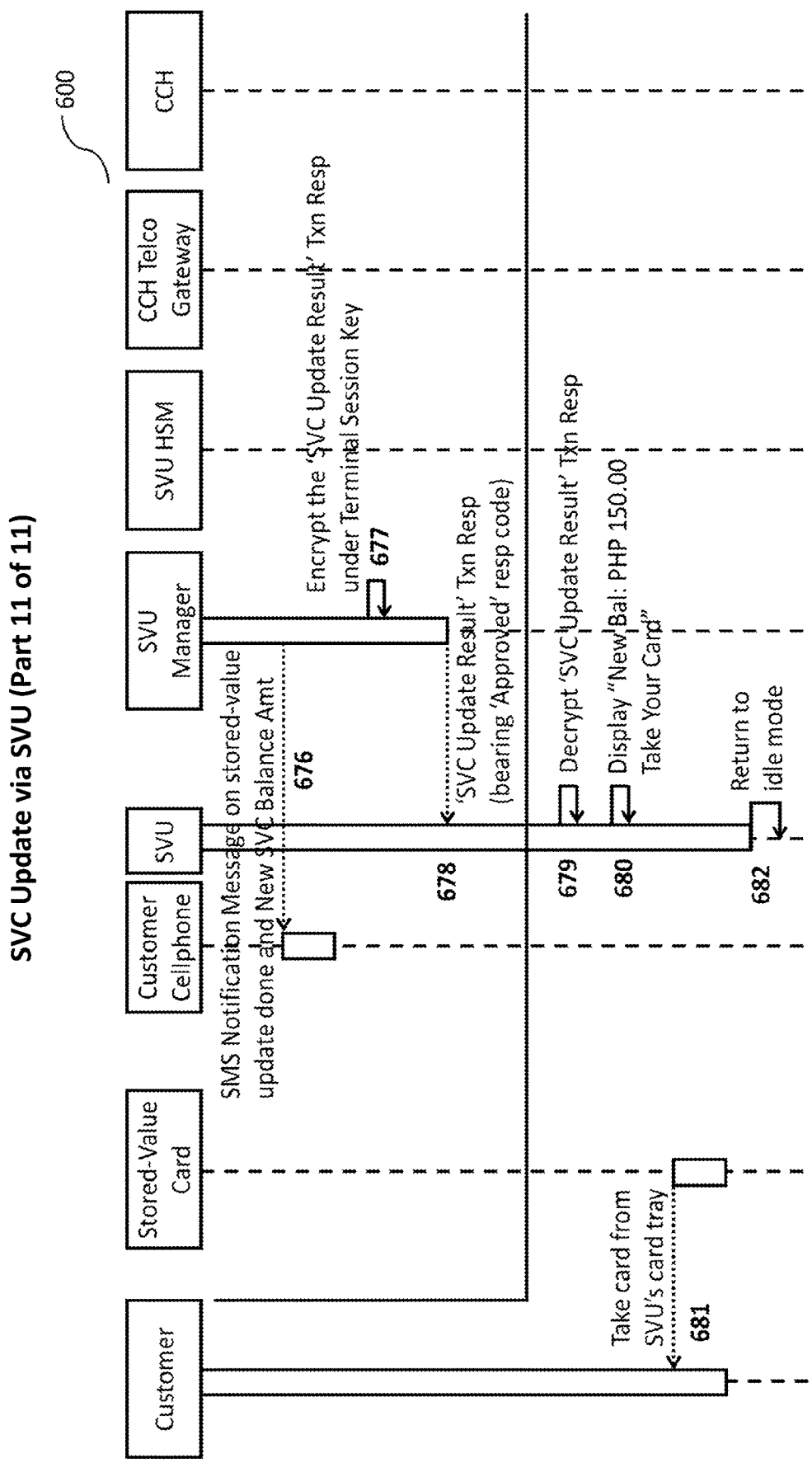

The invention is next described in terms of its operations, in particular with reference to FIG. 4 to FIG. 6. It is to be appreciated that a user initiates top-up or reload via a telco agent, and subsequent actual 'reflection' of the top-up or reloading is performed via the SVU network 140 using the front-end SVU device 142. It is to be appreciated that prior to use, the user's SVC would have been registered with the issuer host 182. The SVC may be identified using a SVC identifier in the form of a card number that may be printed on the SVC.

FIG. 4 illustrates the process associated with a user who first initiates an update transaction, such as a reload or top-up of his stored value card by approaching a telco agent. FIG. 5 illustrates the authentication process between the SVU device and SVU manager prior usage. FIG. 6 illustrates the process associated with the user whom, after receiving a transaction reference from the telco agent, effects the actual transfer of credit to his stored value card via the SVU device.

As shown in FIG. 4, the Customer (user) verbally dictates the SVC Card No. (displayed on the SVC) and Reload Amount to the Telco Agent (step 402). The Telco Agent may be a physical shop or premise.

The Telco Agent enters the SVC Card No. and Reload Amount in his 'SVC Reload' SIM application installed on his mobile device (step 404).

The mobile device 134 of the Telco Agent is operable to send the 'SVC Reload' Transaction Request via a message (e.g. a text message such as SMS) to the transaction facilitator (Telco Agent Reload System) 126 (step 406).

Upon receipt of the transaction request, the Telco Agent Reload System 126 generates a Reload Transaction Reference Number for the SVC reload transaction (step 408).

The Telco Agent Reload System 126 debits a Telco Agent Reload Wallet (not shown) by the Reload Amount (step 410).

The Telco Agent Reload System 126 forwards the 'SVC Reload' Transaction Request to the CCH Telco Gateway (step 412) for clearing.

The CCH Telco Gateway 166 forwards the 'SVC Reload' transaction to the CCH (step 414).

The CCH creates a 'SVC Reload' record (containing the SVC Card No., Reload Amount, and Reload Transaction Reference No.) with a pending transaction status (step 416) for approval or confirmation.

If successful, the CCH returns a 'SVC Reload' Transaction Response (bearing 'Approved' response code, and Reload Transaction Reference No.) to the CCH Telco Gateway 166 (step 418). The CCH Telco Gateway 166 relays the 'SVC Reload' Transaction Response (bearing 'Approved' response code and Reload Transaction Reference No.) back to the Telco Agent Reload System 126 (step 420).

The Telco Agent Reload System 126 then sends the Telco Agent a notification message, for example a SMS notification message, in an example format such as "Load Agent+ 63-920-555-5555 has reloaded AFC Card No. 12345678 with PHP100.00 Txn Ref: 123456789012" (step 422).

The Telco Agent Reload System also sends the Customer an SMS notification message "Your AFC Card No. 12345678 has been reloaded with PHP100.00 Balance: PHP150.00 Stored-Value: PHP50.00 Please update your card's stored-value at the nearest SVU. Txn Ref: 1234567890123" (step 424). Having received the notification message confirming the transaction, the Customer hands the Telco Agent the cash payment (Reload Amount plus Convenience Fee) for the reload (step 426) to complete the transaction.

The above process is preferred over typical prepaid airtime reload process utilized by existing Telco Agent Network, as the Telco Agent Reload System forwards the reload transaction to the Clearinghouse for the creation of an 'SVC Reload' record for the customer, instead of directly processing the reload transaction by itself (i.e., instead of crediting the customer's Prepaid Airtime Account with the reload amount).

FIGS. 5 and 6 illustrates the use of the SVU device for effecting the update, reload, or top-up of the stored value cards.

Prior to the use of the SVU device 142, the SVU device 142 has to be authenticated with the backend SVU manager system 144. The process flow is as described in FIG. 5. In particular, the authentication process 500 is preferably a mutual authentication process flow performed during power-up of the SVU device 142, and is repeated for every 'm' number of hours, or every 'n' number of transactions, arbitrarily determined, whichever comes first. For instance, for SVU devices 142 deployed at a metro rail station, the 'SVU Device Authentication' process is done during power up at start-of-day, and every 30 minutes or 100 transactions hence, whichever comes first. This is to ensure that the SVU Session Key, which is a by-product of the authentication process, is never stale and is thus safe from brute-force cryptographic attack.

The process is initiated by the SVU device 142 which initiate a call 'Generate Terminal Challenge' via its SIM application-programming interface (step 502), hereinafter referred to as SVU SIM. The SVU SIM computes the Terminal Challenge in the following steps (step 504).

a) The SVU SIM generates a random 128-bit value as the Terminal Nonce (a nonce is an arbitrary number used only once in a cryptographic communication).

b) The SVU SIM stores (persists) the Terminal Nonce in SIM flash memory (for later use in Network Response validation, as well as for Session Key computation).

c) The SVU SIM encrypts the Terminal Nonce under the Terminal Key using AES-128 encryption, producing the Terminal Challenge.

d) The SVU SIM returns the Terminal ID and Terminal Challenge to the SVU.

The SVU saves (i.e., stores in a variable in memory) the SVU Challenge Date-Time (for later validation of the SVU Manager Response). As the process is preferably a three-pass mutual authentication process, the SVU must ensure that the SVU Manager's Response it receives later on is within an allowable time period (e.g., no more than 500 ms) of the SVU Challenge (step 506).

The SVU device sends the SVU Challenge (bearing the Terminal ID and Terminal Challenge) to the SVU Manager (step 508).

The SVU Manager computes the 'Network Response' using the SVU HSM (step 510) as follows:

a) The SVU Manager retrieves the Terminal Key (in "operational form"; i.e., encrypted under the SVU HSM's Local Master Key) from the SVU Manager database.

b) The SVU Manager decrypts the Terminal Challenge to yield the Terminal Nonce, by calling a 'Decryption' HSM API (passing to it the Terminal Key and the Terminal Challenge).

c) The SVU HSM decrypts the Terminal Challenge using the Terminal Key and AES-128 decryption, yielding the Terminal Nonce.

d) The SVU HSM returns the Terminal Nonce to the SVU Manager.

e) The SVU Manager persists the Terminal Nonce in the SVU Manager database (for later use in Session Key computation).

f) The SVU Manager then performs a reversible operation on the Terminal Nonce; for example using a bit-flip (one's complement) of the 128-bit Terminal Nonce, producing the Manipulated Terminal Nonce.

g) The SVU Manager then encrypts the Manipulated Terminal Nonce by calling the 'Encryption' HSM API (passing to it the Terminal Key and the Manipulated Terminal Nonce).

h) The SVU HSM encrypts the Manipulated Terminal Nonce under the Terminal Key using AES-128 encryption, producing the Network Response.

i) The SVU HSM returns the Network Response to the SVU Manager.

Once the network response is returned, the SVU Manager then computes the Network Challenge using the SVU HSM according to the following (step 512).

a) The SVU Manager generates a random 128-bit value as the Network Nonce.
b) The SVU Manager persists the Network Nonce in the SVU Manager database (for later use in Session Key computation).
c) The SVU Manager encrypts the Network Nonce to yield the Network Challenge, by calling the 'Encryption' HSM API (passing to it the Terminal Key and the Network Nonce).
d) The SVU HSM encrypts the Network Nonce under the Terminal Key using AES-128 encryption, producing the Network Challenge.
e) The SVU HSM returns the Network Challenge to the SVU Manager.

The SVU Manager persists the current date-time as the SVU Manager Challenge Date-Time for the Terminal ID. Since this is a three-pass mutual authentication process, the SVU Manager must ensure that the SVU Response it receives later on is within an allowable time period (e.g., no more than 500 ms) of the SVU Manager Challenge (step 514).

The SVU Manager returns the SVU Manager Response & Challenge. The response and challenge bear the Terminal ID, Network Response, and Network Challenge data (step 516).

The SVU validates the current date-time (the time of receipt of the SVU Manager Response & Challenge) as within an allowable time period (e.g., 500 ms) of the saved SVU Challenge Date-Time. Any SVU Manager Response & Challenge that falls outside this time period is suspect, for example, a possible hacking attempt (step 518).

The SVU validates the Network Response using the SVU SIM by calling the 'Validate Network Response' SIM API and passing to the SIM API the Network Response (step 520).

The SVU SIM validates the Network Response as follows (step 522):
a) The SVU SIM retrieves the persisted Terminal Nonce.
b) The SVU SIM decrypts the Network Response using the Terminal Key and AES-128 decryption, yielding the Manipulated Terminal Nonce.
c) The SVU SIM reverses the bit-flip operation on the Manipulated Terminal Nonce, yielding the Terminal Nonce.
d) The SVU SIM compares the received and the original Terminal Nonce values. If they are the same, then the Network side is authenticated to the Terminal.
e) The SVU SIM returns the result of the Network Response validation; e.g., the Network is authenticated to the Terminal; thus, the SVU Manager is authenticated to the SVU.

The SVU computes the Terminal Response using the SVU SIM by calling the 'Generate Terminal Response' SIM API, passing to the SIM API the Network Response (step 524).

The SVU SIM computes the Terminal Response as follows (step 526):
a) The SVU SIM decrypts the Network Challenge using the Terminal Key and AES 128 decryption, yielding the Network Nonce.
b) The SVU SIM then performs a reversible operation on the Network Nonce; in our case, a bit-flip of the 128-bit Network Nonce, producing the Manipulated Network Nonce.
c) The SVU SIM then encrypts the Manipulated Network Nonce under the Terminal Key using AES-128 encryption, producing the Terminal Response.
d) The SVU SIM then computes the Terminal Session Key as the Terminal Nonce XOR Network Nonce.
e) The SVU SIM returns the Terminal Response and the Terminal Session Key, to the SVU.

Note: This is similar to how a GSM SIM returns the session key Kc during GSM authentication.

The SVU saves (in a memory variable) the Terminal Session Key for later use in communications between SVU and SVU Manager (step 528).

Note: Unlike the Terminal Key, which is held secret within the SIM, the Terminal Session Key is held in the clear (plaintext form) in the SVU's memory (it should never be persisted to the SVU device's non-volatile memory). While this allows communications between the SVU and the SVU Manager to be encrypted and decrypted faster (via SVU software alone with no need to connect to the SIM for any encryption and decryption), it presents a vulnerability, hence the need to refresh the Terminal Session Key regularly (e.g., every 30 minutes or every 100 transactions, whichever comes first).

The SVU then sends the SVU Response (bearing the Terminal ID and Terminal Response) to the SVU Manager (step 530).

Upon receiving the SVU response, the SVU Manager retrieves the persisted mutual authentication data (Terminal Key, Terminal Nonce, Network Nonce, SVU Manager Challenge Date-Time) using the Terminal ID (step 532).

The SVU Manager validates the current date-time (the time of receipt of the SVU Response) as within an allowable time period, for example, 500 ms of the persisted SVU Manager Challenge Date-Time. Any SVU Response that falls outside this time period is suspected to be, for example, a possible hacking attempt (step 534).

The SVU Manager validates the Terminal Response using the SVU HSM as follows (step 536):
a) The SVU Manager decrypts the Terminal Response to yield the Manipulated Network Nonce, by calling the 'Decryption' HSM API (passing to it the Terminal Key and the Terminal Response).
b) The SVU HSM decrypts the Terminal Response using the Terminal Key and AES-128 decryption, yielding the Manipulated Network Nonce.
c) The SVU HSM returns the Manipulated Network Nonce to the SVU Manager.
d) The SVU Manager reverses the bit-flip operation on the Manipulated Network Nonce, yielding the Network Nonce.
e) The SVU Manager compares the received and the original Network Nonce values. If they are the same, then the Terminal is authenticated to the Network; thus, the SVU is authenticated to the SVU Manager.
f) The SVU Manager computes the Terminal Session Key as Terminal Nonce XOR Network Nonce.
g) The SVU Manager persists the Terminal Session Key for the given Terminal ID (for later use in communications between SVU and SVU Manager) in the SVU Manager Database.

Note: The Terminal Session Key is persisted in the SVU Manager Database in the clear. Although storing keys in the clear is normally considered unsafe, the assumption is that the SVU Manager is in a data centre that is secure enough to ward off hacking attacks on the database. The risk is also reduced by the periodic replacement of the Terminal Session Key (e.g., every 30 minutes or 100 transactions, whichever comes first). Most of all, the critical payload (ISO 7816-4 command and response APDUs to read and update the card) that is protected by the Terminal Session Key is itself protected under a Card Session Key (discussed later) for two layers of protection.

Finally, the SVU Manager responds to the SVU with an 'Approved' response code, indicating that the mutual authentication process was successful (step 538).

In summary, the Terminal (i.e. SVU device) issues a "Terminal Challenge" via a SIM API; the Network (SVU manager) responds with the "Network Response" (computed from the Terminal Challenge); the Network then issues a "Network Challenge"; and the Terminal responds with a "Terminal Response" (computed from the Network Challenge). If the Terminal is satisfied with the "Network Response", then the Network is authenticated to the Terminal. If the Network is satisfied with the "Terminal Response", then the Terminal is authenticated to the Network. Both conditions should be present for the authentication to be mutual.

In other words, the SVU SIM generates and stores a Terminal Nonce; wait for the Network Response holding an encrypted form of that nonce; decrypts that response and compares the generated and received nonce to confirm authentication.

The mutual authentication process described is 'stateful' as contrasted with 'stateless'. In the context of the described embodiments, in the 'stateful' authentication process, the SIM changes from a state of 'generating' (e.g. a cryptographic security nonce), followed by 'waiting' (e.g. for a predetermined period of time for a response), and then 'confirming' that the response received is correct). This is contrasted to the 'stateless' where there is only 'confirming'.

In the stateful authentication process, intermediate values, including authentication vectors generated in real-time such as terminal nonce, session key etc. are kept/held in the SVU SIM and at the SVU Manager throughout the exchange of authentication messages. To facilitate tracking of the authentication process by both parties, the mutual authentication process is considered as a transaction with its own Transaction Reference Number.

It is to be appreciated that the authentication vectors generated in real-time is better than storing and maintaining counters for authentication vectors generated in advance.

The SVU Manager uses this Transaction Reference Number to look up intermediate authentication values persisted to the SVU Manager database.

As with typical GSM authentication, where the Authentication Key (Ki) key of every single GSM SIM is stored in the authentication (AuC) database, the Terminal Key (an AES-128 key) of every single SVU SIM is stored in the SVU Manager database. During storage in the database, these Terminal Keys are in "operational form" (i.e., encrypted under the HSM's Local Master Key for protection when outside the HSM, and decrypted internally by the HSM during use in encryption and decryption operations).

Also, as with GSM authentication, where the GSM SIM is identified using the IMSI, the SVU SIM is identified using a Terminal ID. And, where the GSM device is identified using the IMEI, the SVU device is identified using an SVU ID (a device serial number), which is not used in any of the mutual authentication or reload & update processes, except for documentation purposes.

Communications between the SVU and the SVU SIM for the mutual authentication process may be via a standard ISO 7816-4 APDU (Application Protocol Data Unit) unit. Beyond the authentication process, communications is via SM-APDU (Secure Messaging APDU) units using the Card Session Key established during the mutual authentication process.

The SIM routines can be implemented using Java cardlets on a JavaCard SIM. Reiterating, instead of a standard telecommunications GSM authentication, a general-purpose HSM is used during the authentication process.

The described mutual authentication method is advantageous in that it is stateful with no counters maintained, unlike in 3G mutual authentication. Also, the backend is a general-purpose HSM instead of a specialized GSM authentication center. It is to be appreciated that the same HSM would be used in the computation of stored-value card cryptograms in the stored value card top-up/update via the stored value device unit process as described below.

The process 600 relating to a stored value card (SVC) update via a stored value unit (SVU) is as follows. It is here where the pending reload, which was set up in the previous process, is finally reflected on to the Stored-Value Card. The process 600 entails mutual authentication between the Stored-Value Card and the SVU Manager, which yields a Card Session Key. This is similar to the mutual authentication between the SVU SIM and the Network Manager discussed earlier in process 500, which yields a Terminal Session Key. However, unlike the Terminal Session Key that is kept in the clear in SVU memory (albeit frequently refreshed), the Card Session Key remains hidden in the SVC.

The process flow begins with the SVU in idle mode and displays the message "StoredVal Update Place Card Here" on its 16×2 LCD display (step 601).

A Customer who wishes to places his stored-value card on the SVU's card tray (step 602).

The SVU detects the presence of the stored value card and its associated technology during the ISO 14443 Initialization & Anti-collision process (step 603).

The SVU displays the Issuer name in the message "AFC Card Please Wait" on its 16×2 LCD display to inform the user/customer that it has detected the card successfully (step 604).

The SVU next generate an Update Transaction Reference Number for this SVC update transaction (step 605). It is to be appreciated that this number is unique throughout the system and one possible format is <SVU ID><Date and Time>. The recordal of the time parameter may also be down to a predetermined precision, such as, for example, milliseconds.

Once the update transaction reference number is generated, the mutual authentication process is initiated (step 606) via the following sub-steps.

a) The SVU sends a 'GET_CHALLENGE' Command via an application protocol data unit (APDU) to the SVC.
b) The SVC generates a random 128-bit Card Nonce, and a random 128-bit Card Challenge, and stores/persists them for later use.
c) The SVC returns a 'GET_CHALLENGE' Response APDU (bearing Card Nonce and Card Challenge) to the SVU.

The SVU then append the information from the Update Transaction Ref. No., Terminal ID, Card No., Card Nonce, and Card Challenge to form the SVC Challenge, and encrypts it under the Terminal Session Key computed during the last mutual authentication between SVU and SVU Manager as described in process 500 (step 607).

The SVU then sends the Encrypted SVC Challenge (bearing the Update Transaction Ref. No., Terminal ID, Card No., Card Nonce, and Card Challenge) to the SVU Manager (step 608).

Upon receipt of the encrypted SVC challenge, the SVU Manager retrieves the Terminal Session Key (which was persisted by the SVU Manager during the last mutual authentication between SVU and SVU Manager as discussed earlier) for the given Terminal ID (step 609).

The SVU Manager then proceeds to decrypt the Encrypted SVC Challenge using the Terminal Session Key (step 610).

Once decrypted, the SVU Manager computes the Network Challenge between the SVU manager and SVU HSM as follows (step 611):

a) The SVU Manager retrieves the proper Issuer's Card Master Key from the SVU Manager Database based on the BIN (Bank Identification Number) prefix of the Card No.

Note: This is the mechanism by which the SVU caters to several card Issuers (each with its own Card Master key) without using multiple SAM slots in the device.

b) The SVU Manager calls the SVU HSM's 'Key Diversification' API (bearing the Card Master Key and Card ID).

c) The SVU HSM diversifies the Card Master Key to generate the card-unique Card Key.

d) The SVU HSM returns the card-unique Card Key to the SVU Manager.

e) The SVU Manager generates a random 128-bit Network Nonce, and a random 128-bit Network Challenge.

The SVU Manager then computes the Network Response as follows (step 612):

a) The SVU Manager calls the SVU HSM's 'Encryption' API (bearing the Card Key, and the Card Nonce XOR Network Nonce value).

b) The SVU HSM encrypts the Card Nonce XOR Network Nonce value under the Card Key, yielding the Card Session Key.

c) The SVU HSM returns the Card Session Key to the SVU Manager.

d) The SVU Manager persists the Card Session Key for the given Terminal ID (for later use in Card Response re-computation at the SVC side).

e) The SVU Manager calls the SVU HSM's 'Encryption' API (bearing the Card Session Key, and the Card Challenge value).

f) The SVU HSM encrypts the Card Challenge under the Card Session Key, yielding the Network Response.

g) The SVU HSM returns the Network Response to the SVU Manager.

The SVU Manager forms the SVU Manager Response & Challenge (from the Update Transaction Ref. No., Network Response, Network Nonce, and Network Challenge), and encrypts it under the Terminal Session Key (step 613).

Once encrypted, the SVU Manager returns the Encrypted SVU Manager Response & Challenge (bearing the Update Transaction Ref. No., Network Response, Network Nonce, and Network Challenge) to the SVU (step 614).

Upon receipt of the response and challenge, the SVU decrypts the SVU Manager Response & Challenge using the Terminal Session Key (step 615).

The SVU validates the SVU Manager Response as follows (step 616):

a) The SVU sends a 'MUTUAL_AUTHENTICATE' Command APDU (bearing the Network Response, Network Nonce, and Network Challenge) to the SVC.

b) The SVC retrieves the Card Nonce and Card Challenge that it persisted earlier.

c) The SVC encrypts the value 'Card Nonce XOR Network Nonce' under the Card Key, yielding the Card Session Key.

Note: Unlike the Terminal Session Key, which is kept in the clear (plaintext form) in the SVU's memory, the Card Session Key never leaves the card, making it very secure from hacking.

d) The SVC re-computes the Network Response at the SVC side by encrypting the original Card Challenge under the Card Session Key.

e) The SVC compares the received and the re-computed Network Response. If they are the same, then the Network is authenticated to the Card, and the process continues.

Note: Failure of the Network to authenticate itself to the Card indicates an attempt by a hacker to impersonate an SVU Manager. The SVU should then halt processing and display a message such as "Unauthorized Network. Take Your Card".

The SVU computes the Card Response as follows (step 617):

a) The SVU encrypts the Network Challenge under the Card Key, yielding the Card Response.

b) The SVU returns a 'MUTUAL_AUTHENTICATE' Response APDU (bearing the Card Response) to the SVU.

The SVU forms the SVC Response (from the Update Transaction Ref. No., Terminal ID, Card ID, and Card Response) and encrypts it under the Terminal Session Key (step 618).

The SVU sends the Encrypted SVC Response bearing the Update Transaction Ref. No., Terminal ID, Card ID, and Card Response to the SVU Manager (step 619).

The SVU Manager then retrieves the persisted Terminal Session Key and Card Session Key for the given Terminal ID (step 620).

The SVU Manager decrypts the Encrypted SVC Response using the Terminal Session Key (step 621).

The SVU Manager validates the Card response as follows (step 622):

a) The SVU Manager calls the SVU HSM's 'Encryption API (bearing the Card Key and Network Challenge).

b) The SVU HSM encrypts the Network Challenge under the Card Session Key, yielding the re-computed (at Network-side) Card Response.

c) The SVU HSM returns the re-computed Card Response to the SVU Manager.

d) The SVU Manager compares the received and the re-computed Card Response. If they are the same, then the Card is authenticated to the Network, the mutual authentication is complete, and the stored-value update process continues.

Note: Failure of the Card to authenticate itself to the Network indicates an attempt by a hacker to fake an SVC. The SVU Manager should then return a 'Declined' response to the SVU, which should then halt processing and display "Unauthorized Card. Take Your Card".

The SVU Manager forms the 'Approved' response (bearing the Update Transaction Ref. No., and 'Approved' Response Code) under the Terminal Session Key (step 623).

The SVU Manager returns the Encrypted 'Approved' response (bearing the Update Transaction Ref. No., and 'Approved' Response Code) to the SVU (step 624).

The SVU decrypts the Encrypted 'Approved' response using the Terminal Session Key, and notes that mutual authentication between Card and Network was successful (step 625).

Note: At this point, the SVC has been authenticated to the SVU Manager and vice-versa, and the Card Session Key has been established. Reading the card's stored-value balance and subsequent update may commence.

For reading the card's stored value, the SVU first displays the message "Reading Card—Do Not Remove" on its 16×2 LCD display (step 626).

The SVU forms the 'SVC Balance Inquiry' Transaction Request (from the Update Transaction Ref. No., Terminal ID, and Card ID), and encrypts it under the Terminal Session Key (step 627).

The SVU sends the Encrypted 'SVC Balance Inquiry' Transaction Request (bearing the Update Transaction Ref. No., Terminal ID, and Card ID) to the SVU Manager (step 628).

The SVU Manager retrieves the Terminal Session Key and Card Session Key (which were persisted by the SVU Manager earlier) for the given Terminal ID (step 629).

Note that while the Terminal Session Key is in the clear in the database and in SVU Manager memory, the Card Session Key is always in "operational form" (encrypted under the SVU HSM's Local Master Key) in the database and in SVU Manager memory. Encryption and decryption using the Terminal Session Key are done in software (for greater speed), while encryption and decryption using the Card Session are done using the SVU HSM (for greater security).

The SVU Manager decrypts the Encrypted 'SVC Balance Inquiry' Transaction Request using the Terminal Session Key (step 630).

The SVU Manager forms the ISO-7816-4-based SVC command cryptogram for reading the card's stored-value (step 631), as follows:
a) The SVU Manager builds the 'READ_RECORD' Command APDU Data.
b) The SVU Manager calls the SVU HSM's 'Encryption' API (bearing the Card Session Key, and 'READ_RECORD' Command APDU Data).
c) The SVU HSM encrypts the 'READ_RECORD' Command APDU Data under the Card Session Key, yielding the 'READ_RECORD' Command SM-APDU (Secure Messaging—Application Protocol Data Unit) Data.
d) The SVU HSM returns the 'READ_RECORD' Command SM-APDU Data to the SVU Manager.
e) The SVU Manager builds the 'READ_RECORD' Command SM-APDU from the returned Command SM-APDU Data.

The SVU Manager forms the 'SVC Balance Inquiry' Transaction Response (from the Update Transaction Ref. No., Terminal ID, Card No., and 'READ_RECORD' Command SM-APDU), and encrypts it under the Terminal Session Key (step 632).

The SVU Manager returns the Encrypted 'SVC Balance Inquiry' Transaction Response (bearing the Update Transaction Ref. No., Terminal ID, Card No., and 'READ_RECORD' Command SM-APDU) to the SVU (step 633).

The SVU decrypts the Encrypted 'SVC Balance Inquiry' Transaction Response using the Terminal Session Key (step 634).

Upon decryption, the SVU reads the card's stored-value as follows (step 635):

a) The SVU sends the 'READ_RECORD' Command SM-APDU to the SVC.
b) The SVC decrypts the 'READ_RECORD' Command SM-APDU using the Card Session Key, yielding the 'READ_RECORD' Command APDU.
c) The SVC processes the 'READ_RECORD' Command APDU, notes the results in the 'READ_RECORD' Response APDU, and encrypts the latter under the Card Session Key, yielding the 'READ_RECORD' Response SM-APDU.
d) The SVC returns the 'READ_RECORD' Response SM-APDU (bearing the encrypted SVC Balance Amount, and Status Word) to the SVU.

The SVU forms the 'SVC Balance Value' Transaction Request (from the Update Transaction Ref. No., Terminal ID, Card No., and 'READ_RECORD' Response SM-APDU), and encrypts it under the Terminal Session Key (step 636).

The SVU sends the Encrypted 'SVC Balance Value' Transaction Request (bearing the Update Transaction Ref. No., Terminal ID, Card No., and 'READ_RECORD' Response SM-APDU) to the SVU Manager (step 637).

The SVU Manager retrieves the Terminal Session Key and Card Session Key (persisted earlier) for the given Terminal ID (step 638).

The SVU Manager decrypts the Encrypted 'SVC Balance Inquiry' Transaction Request using the Terminal Session Key (step 639).

The SVU Manager extracts the 'READ_RECORD' Response SM-APDU Data from the transaction request (step 640).

The SVU Manager processes the ISO-7816-4-based SVC response cryptogram as follows (step 641):
a) The SVU Manager calls the SVU HSM's 'Decryption' API (bearing the Card Session Key, and 'READ_RECORD' Response SM-APDU Data).
b) The SVU HSM decrypts the 'READ_RECORD' Response SM-APDU Data using the Card Session Key, yielding the Response APDU Data.
c) The SVU HSM returns the 'READ_RECORD' Response APDU Data to the SVU Manager.
d) The SVU Manager parses the 'READ_RECORD' Response APDU Data, yielding the SVC Balance Amount and the Card Read Status (from the Status Word).

Note: If the reading of the card's stored-value was unsuccessful, it is detected only at this point. A 'Declined' response code is then returned by the SVU Manager in its response to the SVU.

The SVU Manager persists the SVC Balance Amount for the given Terminal ID, in the SVU Manager Database (step 642).

The SVU Manager forms the 'SVC Balance Value' Transaction Response (from the Update Transaction Ref. No., Terminal ID, Card No., Card Read Status), and encrypts it under the Terminal Session Key (step 643).

The SVU Manager returns the Encrypted 'SVC Balance Value' Transaction Response (bearing the Update Transaction Ref. No., Terminal ID, Card No., and SVC Balance Amount) to the SVU (step 644).

The SVU decrypts the 'SVC Balance Value' Transaction Response using the Terminal Session key (step 645).

The SVU extracts the Card Read Status from the transaction response and checks that it is 'OK' (step 646).

Updating the Card's Stored-Value:

The SVU displays the message "Updating Card . . . Do Not Remove" on its 16×2 LCD display (step 647).

The SVU forms the 'SVC Update' Transaction Request (from the Update Transaction Ref. No., Terminal ID, Card ID, and SVC Balance Amount), and encrypts it under the Terminal Session Key (step 648).

The SVU sends the Encrypted 'SVC Update' Transaction Request (bearing the Update Transaction Ref. No., Terminal ID, Card ID, and SVC Balance Amount) to the SVU Manager (step 649).

The SVU Manager retrieves the Terminal Session Key and Card Session Key (which were persisted by the SVU Manager earlier) for the given Terminal ID (step 650).

The SVU Manager decrypts the Encrypted 'SVC Balance Inquiry' Transaction Request using the the Terminal Session Key (step 651).

The SVU Manager forms the 'SVC Pending-Reload Inquiry' Transaction Request (bearing the Update Transaction Ref. No., Terminal ID, Card No., and SVC Balance Amount), and sends it to the CCH Telco Gateway. Note that this transaction request is no longer encrypted since it is assumed that the network connection between the SVU Manager and the CCH Telco Gateway is a secure leased line (step 652).

The CCH Telco Gateway forwards the 'SVC Pending-Reload Inquiry' Transaction Request to the CCH (step 653).

The CCH validates the Card for the given Card No., checking that the Card Status is 'Active' (not 'Lost', 'Stolen', etc), and checking that the given SVC Balance Amount is consistent with the one in the CCH's database (step 654).

The CCH retrieves all of the given Card No.'s 'SVC Reload' record(s) with status 'Pending' and computes the SVC Total Pending Reload Amount (the sum of all pending-reload amount(s)). It then updates the status of these record(s) from 'Pending' to 'Transmitted', and also marks them with the Update Transaction Ref. No (step 655).

The CCH forms the 'SVC Pending-Reload' Inquiry' Transaction Response (from the Update Transaction Ref. No., SVC Total Pending-Reload Amount, and Card Status), and returns it to the CCH Telco Gateway (step 656).

The CCH Telco Gateway relays the 'SVC Pending Reload' Transaction Response to the SVU Manager (step 657).

The SVU Manager persists the SVC Total Pending-Reload Amount for the given Terminal ID, in the SVU Manager Database (step 658).

Note: If the SVC Total Pending-Reload Amount turns out to be zero (i.e., no 'SVC Reload via Telco Agent' transactions were made), then no further SVC cryptograms are created. The SVU Manager simply provides the SVU with the SVC Balance Amount (which the SVU Manager persisted earlier), and the SVU displays this amount on its LCD display as "Bal: PHP100.00 Take Your Card".

The SVU Manager computes the New SVC Balance Amount as the sum of the original SVC Balance Amount and the SVC Total Pending-Reload Amount (step 659).

The SVU Manager forms the ISO-7816-4-based SVC command cryptogram for updating the card's stored-value (step 660):
a) The SVU Manager builds the 'UPDATE_RECORD' Command APDU Data, which includes the New SVC Balance Amount.
b) The SVU Manager calls the SVU HSM's 'Encryption' API (bearing the Card Session Key, and 'UPDATE_RECORD' Command APDU Data).
c) The SVU HSM encrypts the 'UPDATE_RECORD' Command APDU Data under the Card Session Key, yielding the 'UPDATE_RECORD' Command SM-APDU (Secure Messaging—Application Protocol Data Unit) Data.
d) The SVU HSM returns the 'UPDATE_RECORD' Command SM-APDU to the SVU Manager.
e) The SVU Manager builds the 'UPDATE_RECORD' Command SM-APDU from the returned Command SM-APDU Data.

The SVU Manager forms the 'SVC Update' Transaction Response (from the Update Transaction Ref. No., Terminal ID, Card No., and 'UPDATE_RECORD' Command SM-APDU), and encrypts it under the Terminal Session Key (step 661).

The SVU Manager returns the Encrypted 'SVC Update' Transaction Response (bearing the Update Transaction Ref. No., Terminal ID, Card No., and 'UPDATE_RECORD' Command SM-APDU) to the SVU (step 662).

The SVU decrypts the 'SVC Update' Transaction Response using the Terminal Session Key (step 663).

The SVU updates the card's stored-value in accordance with step 664 as follows:
a) The SVU sends the 'UPDATE_RECORD' Command SM-APDU to the SVC.
b) The SVC decrypts the 'UPDATE_RECORD' Command SM-APDU using the Card Session Key, yielding the 'UPDATE_RECORD' Command APDU.
c) The SVC processes the 'UPDATE_RECORD' Command APDU, notes the results in the 'UPDATE_RECORD' Response APDU, and encrypts the latter under the Card Session Key, yielding the 'UPDATE_RECORD' Response SM-APDU.
d) The SVC returns the 'UPDATE_RECORD' Response SM-APDU (bearing the encrypted Status Word) to the SVU.

Upon update, the SVU forms the 'SVC Update Result' Transaction Request (from the Update Transaction Ref. No., Terminal ID, Card No., and 'UPDATE_RECORD' Response SM-APDU), and encrypts it under the Terminal Session Key (step 665).

The SVU sends the Encrypted 'SVC Update Result' Transaction Request (from the Update Transaction Ref. No., Terminal ID, Card No., and 'UPDATE_RECORD' Response SM-APDU) to the SVU Manager (step 666).

The SVU Manager retrieves the Terminal Session Key, Card Session Key, SVC Balance Amount, and SVC Total Pending-Reload Amount (persisted earlier) for the given Terminal ID (step 667).

The SVU Manager decrypts the Encrypted 'SVC Update Result' using the Terminal Session Key (step 668).

The SVU Manager processes the ISO-7816-4-based SVC response cryptogram as follows (step 669):
a) The SVU Manager calls the SVU HSM's 'Decryption' API (bearing the Card Session Key, and 'UPDATE_RECORD' Response SM-APDU Data).
b) The SVU HSM decrypts the 'UPDATE_RECORD' Response SM-APDU Data using the Card Session Key, yielding the Response APDU Data.
c) The SVU HSM returns the 'UPDATE_RECORD' Response APDU Data to the SVU Manager.
d) The SVU Manager parses the 'UPDATE_RECORD' Response APDU Data, yielding the Card Update Status (from the Status Word).

The SVU Manager forms the 'SVC Reflected-Reload Update' Transaction Request (bearing the Update Transaction Ref. No., Terminal ID, Card No., SVC Total Pending-Reload Amount, and Card Update Status), and sends it to the CCH Telco Gateway (step 670).

The CCH Telco Gateway forwards the 'SVC Reflected-Reload Update' to the CCH (step 671).

The CCH updates the status of the 'SVC Reload' record(s) for the given Update Transaction Ref. No., from 'Transmitted' to 'Reflected' (step 672).

The CCH calls the particular Issuer's Card Host API to credit the SVC Account with the SVC Total Reflected-Reload Amount in accordance with step 673 (which was persisted on the SVU Manager earlier and passed on to the CCH Telco Gateway).

Note: At this point, the backend SVC Account's balance is not necessarily equal to that of the stored-value on the card itself since offline payments (debits to the card account) may have occurred during the period between the 'SVC Reload via Telco Agent' transaction and the 'SVC Update via SVU' transaction. These debits will be reflected to the SVC Account only upon posting of these offline payments at end-of-day.

The CCH returns the 'SVC Reflected-Reload Update' Transaction Response (bearing 'Approved' response code) to the CCH Telco Gateway (step 674).

The CCH Telco Gateway relays the 'SVC Reflected-Reload Update' Transaction Response to the SVU Manager (step 675).

The SVU Manager computes the New SVC Balance Amount (as original SVC Balance Amount plus SVC Total Reflected-Reload Amount), and sends the Customer an SMS notification message "Your AFC Card No. 12345678 has been updated for use. New Bal: PHP150.00 Txn Ref. No. 123456789012" (step 676).

The SVU Manager forms the 'SVC Update Result' Transaction Response (from the New SVC Balance Amount and 'Approved' response code), and encrypts it under the Terminal Session Key (step 677).

The SVU Manager returns the 'SVC Update Result' Transaction Response in accordance with step 678 (bearing New SVC Balance Amount, 'Approved' response code).

The SVU decrypts the 'SVC Update Result' Transaction Response using the Terminal Session Key (step 679).

The SVU extracts the New SVC Balance Amount from the transaction response, and displays "New Bal: P150.00 Take Your Card" for a few seconds on its LCD display (step 680).

The Customer takes his card from the SVU's card tray (step 681).

The SVU returns to idle mode (step 682).

It is to be appreciated that actions at the SVU and SVU Manager are performed in a SAM in the Ticket Vending Machine.

The following summarizes the salient processes of the SVC update via the SVU network.

Upon placement of the stored value card at the SVU device, the SVU Network sends an 'SVC Pending-Reload Inquiry' transaction request to the CCH Telco Gateway, which in turn returns the sum of all pending reloads computed by the CCH. The CCH then changes the status of the 'SVC Reload' record(s) from 'Pending' to 'Transmitted'. The SVU Network relays this sum to the card in an encrypted manner for proper crediting of the stored-value. Once the card's stored-value update is confirmed, the SVU Network sends an 'SVC Reflected-Reload Update' transaction request to the CCH Telco Gateway for the CCH to mark all the reload record(s) as 'Reflected'. Subsequent SVC update transactions (repeated taps at the SVU device) would have no further effect on the card, until an SVC reload (via the Telco Agent Network) is performed again.

Any notification of the Customer regarding the success or failure of the SVC Update transaction may be via status lights and displayed message on the SVU device, as well as via SMS (using the connection between the SVU Manager and the SMS centres of the telecommunications network).

Upon placement of a stored value card, the SVU device automatically detects the presence of the card, as well as the type of contactless technology used (e.g. MiFare Classic, MiFare DESFire, OSPT CiPurse, others). The device may then beeps and displays the message "AFC Card Please Wait".

During the updating of stored-value, the SVU displays the message "Updating Card—Do Not Remove" and flashes its yellow LED lamp repeatedly.

After the stored-value update (a process which may take a few seconds), the SVU beeps again, display the updated-balance message "Bal: XXX dollars. It is safe to remove your card", and flashes its green LED lamp repeatedly.

In the event of a loss of end-to-end network connectivity, the SVU displays the message "Offline", and flashes its red LED lamp repeatedly. Upon restoration of network connectivity, the device returns to idle mode.

Similarly, in the event of a loss of electrical power, the SVU displays the message "Power Failure. No transactions allowed", and flashes its red LED lamp repeatedly. Upon restoration of power, the device returns to idle mode.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein. In particular:

The SVU device 142 and the SVU manager 144, when configured for public use in some embodiments, comprises a reader, a display, and a SIM for security). The HSM at the backend (remotely positioned relative to the SVU device) is advantageous since it provides SAM-equivalent functionality. However, the "SVC Reload via Telco Agent" process can be replaced with any other "out-of-band" reloading process; e.g., reloading of the SVC via Mobile Banking, or Internet Banking, or web-based credit card transaction. It is to be appreciated that the invention will work with any reloading backend that can interface with the CCH Telco Gateway 144 to allow the pending reload to be staged in the Central Clearing House's 'SVC Reloads' database, for later "reflection" to the stored-value card via the SVU.

The invention's backend SAM equivalent feature can also be used for POS terminals. A POS terminal with the SAM functionality in the backend is advantageous as it has better security than one with the SAM within the device itself. However, it still requires that loss or theft of the POS terminal be immediately reported to allow immediate blocking of the POS terminal to prevent fraudulent purchase and reload transactions. With the backend SAM equivalent, the Card Master Keys remain safe in the backend even during loss or theft of the POS terminal.

Although the authentication process described in various embodiments is typically a mutual authentication that is 'stateful', it is to be appreciated that other types of mutual authentication methods may be deployed. For example, GSM, 2G or 3G authentication may be utilized. An example will be the use of a 3G USIM for mutual authentication (and session key creation) if the only SIMs and backend available are 3G USIMs and a 3G Authentication Centre (AuC). These authentication methods may be two-pass rather than the three-pass mutual authentication as described in the embodiments. It is to be appreciated that the described three-pass authentication methods ideally work best with a customized SIM and customized backend that deploy a hardware security module (HSM) instead of an authentication centre. Such an arrangement is typically simpler and less expensive.

In other embodiments, a user's user device (for example a smartphone) may be used to facilitate authentication and reloading. For example, where the mobile device is enabled with near-field communication (NFC) capability, using radio frequencies or otherwise, containing a secure element (SE) that contains a 'virtual SVC' (in addition to the customer's usual credit cards and loyalty cards), and the NFC feature is configured to be in "card emulation" mode. In such a case, the user taps his NFC handset on a SVU for the SVC in the SE to be reloaded. The NFC enabled handset in this case may thus function as a substitute for a physical stored-value card (in addition to other physical credit, debit, and loyalty cards). It is to be appreciated that in practice, reloading of an SE-based SVC in an NFC handset may be performed OTA (over-the-air) facilitated by a dedicated software ('app') provided by the SVC Issuer. However, reloading via the SVU using NFC is cheaper since it does not incur any airtime charges. When this is done, the same user device may be used for both the SVC update and the reload notification processes.

The SVU's communications with the SVU Manager is not restricted to UDP-based protocol. Other communication protocols such as TCP or SMS-based protocols can also work. However, in view of the following reasons:

1) The messages between the SVU and the SVU Manager are small (no more than 200 bytes per request/response message); and 2) The SVU already implements a store-and-forward mechanism for assured message delivery during intermittent network downtime;

Therefore, utilization of TCP protocol, typically used for large message handling such as webpages and other large contents and associated guaranteed delivery is no longer required and using UDP-based communication results in better performance.

In accordance with another embodiment of the invention, where like reference numerals reference like parts, there is a stored value updater network arranged to receive a request to update a stored value card, the stored value updater network comprising a front-end device having a stored value card reader/writer for reading and updating the stored value card; and a backend manager in data communication with the front-end device, wherein the backend manager positioned remotely relative to the front-end device.

The stored value updater network may be the Telco SVU network 140 as described in earlier embodiment(s) and may be hosted as part of a network provider such as a telecommunications network. The stored value updater network may comprise a plurality of SVU devices 142 at the front-end and the SVU Manager 144 at the backend. The SVU Manager 144 typically comprises one or more servers, distributed or otherwise, in data communication with one or more databases 146 that maintain records of all SVU devices 142 and their statuses. The statuses may include whether the SVU device 142 is valid, blocked due to downtime, lost, etc. The SVU manager 144 is operable to be in data communication with the SMS centre 124. Telco SVU network 140 further comprises a hardware security module 148 for encryption or decryption. The front-end devices 142 and backend SVU manager 144 may communicate via user datagram protocol (UDP) via a suitable access network. It is to be appreciated that the SVU manager 144 is geographically separated from the SVU devices 142, i.e. positioned remotely relative to the SVU devices 142.

The arrangements as described in the various embodiments are advantageous at least in the following ways:

The SVU device and backend operate in conjunction with an "out-of-band" reloading system. By "out-of-band", the device and/or channel used by the "reloading" process (where the card account is credited at the backend) is/are different from those used by the "reflection" process (where the card account is credited at the card's stored-value itself). For instance, reloading of the card via the Telco Agent Network would use the Agent Cellphone and/or the GSM SMS channel, while reflection to the physical card via a plurality of SVU devices would use the SVU device and a TCP/IP leased line connection. The advantage of using an out-of-band reloading system is that the SVU device cannot be used for fraudulent reloading of the stored-value card, even if the SVU device falls into the wrong hands. The SVU device's function is purposely restricted solely to updating the stored-value in the card with pending reloads. If a hacker wants to have the card credited with a fraudulent amount, he would have to find a way to hack the Telco Agent Network reloading process itself, which is difficult.

Preferably, the SVU device has no buttons or touchscreens. There are thus no menus that the customer has to navigate. The customer's interaction with the SVU is limited solely to the placing of the Stored-Value Card on the tray, and its removal after the update of the stored value. The SVU's small 16-character-by-2-lines LCD display and LED lamps (green, yellow, and red) provide visual feedback, while the devices' speaker provides audible feedback (beeps). Such an arrangement limits the device's use to updating the card with pending reloads to prevent it from being used for fraudulent reloading.

The SVU is low-cost as it can be manufactured for around USD100 by keeping the required functionality to a minimum: (1) no buttons or touchscreens (as mentioned above), (2) no heavy metal enclosure (since there are no SAMs or cashbox to safeguard).

As the SVU is designed to be an online device (i.e. it is not intended for offline card validation or offline stored-value update) and operable to have constant network connectivity with the SVU Manager. This allows immediate feedback if a card account is blocked due to loss or theft (unlike typical offline systems which require 24 hours or so for their blacklists to be updated, allowing fraudulent transactions).

The SVU does not require a SAM by having a constantly accessible SAM equivalent (an HSM or Hardware Security Module based system) at the backend. This prevents the device from being used to fraudulently add credit to a card's stored-value, since the cryptograms used in the crediting the stored-value originate from the SAM equivalent at the backend, not from the device itself. Thus, a crook who wishes to add fraudulent credit to the card will have to find a way to tamper with the cryptogram computation at the backend in a data center, which is inherently more secure. In contrast, an offline contactless POS terminal bearing a SAM, once stolen, can be used to credit stored-value cards at will.

The SVU is capable of supporting a large number of card issuers (e.g., twenty or more), way beyond that of a TVM or a contactless POS terminal. It does so, again, through the SAM equivalent at the backend.

The SVU process does not impose a "Minimum Reload Amount", or if it does, it does so at a negligible amount. As mentioned in the previous section, this is done by relegating the cash part of the reload transaction to the Telco Agent Network, which by itself imposes a negligible "Minimum Reload Amount".

The SVU, due to its low cost, can be deployed in very large numbers for both scalability and redundancy. For instance, twenty of these devices can be bolted to the wall of a metro rail station to minimize the queuing time of customers wishing to have their Stored-Value Cards updated with pending reloads, prior to entering the metro rail's gates. Also, having, say, a fourth of the units down (5 out of 20) due to device breakdown, theft, or other reasons, do not impact the queues adversely. Deployment in large numbers also allows for network connection redundancy by having, say, half of the devices connected to a certain network service provider, and half to a different one.

The SVU backend is tightly integrated with the network provider such as a telecommunications network, allowing immediate sending of SMS notification messages to mobile phones of customers regarding their cards' balance, stored-value update, or account blocking due to loss or theft, etc.

The SVU is low-power and thus can be powered directly by a small battery. With the battery charged continuously when the device is plugged into an electrical outlet, the device is provided with a rudimentary form of UPS (Uninterruptible Power Supply), which in the event of a power failure in mid-transaction, allows the device to finish all pending communications before entering into a 'No Transactions Allowed at the Moment' mode in a non abrupt manner, and maintaining this mode until power is restored. This ensures that card updates are not left in an incomplete state at the card and at the backend even during power failure.

It is to be appreciated that although the various embodiments have been described in the context of a stored value card, the invention may be extended to other types of contactless smart card as known to a skilled person and the term 'stored value card' could be construed broadly as covering other types of contactless smart card.

It is to be further appreciated that although individual embodiments of the invention have been described it is intended that the invention also covers combinations of the embodiments discussed. In particular, features described in one embodiment not being mutually exclusive to a feature described in another embodiment may be combined to form yet further embodiments of the invention.

The invention claimed is:

1. A system for updating a stored value card comprising:
   (a) a stored value updater (SVU) network including:
      (i) an access network;
      (ii) a plurality of SVU devices, each SVU device including a microcontroller board, a subscriber identity module (SIM) card, a contactless card reader, and a network module,
         (1) wherein each SVU device is configured for encrypted data communication with the access network,
         (2) wherein each SVU device is configured to receive a plurality of stored value update requests via contactless communication from a plurality of stored value cards (SVC);
         (3) wherein each SVC is associated with an SVC identifier; and
         (4) wherein each stored value update request includes one of the SVC identifiers and a requested reload amount;
      (iii) an SVU manager comprising one or more servers and at least one first database,
         (1) wherein the SVU manager is configured for data communication with the plurality of SVU devices through the access network,
         (2) wherein the one or more servers are configured for data communication with the least one first database;
         (3) wherein the at least one first database includes a plurality of first records;
         (4) wherein each first record is associated with one of the SVU devices and each first record includes a status for the SVU device associated with the first record; and
      (iv) a first hardware security module;
   (b) a plurality of card issuer networks, each card issuer network including an issuer host and a stored value card account database; and
   (c) a central clearing house network including a stored-value card reload database, a telco gateway, and a second hardware security module,
      (i) wherein the central clearing house network is configured for data communication with the plurality of card issuer networks;
      (ii) wherein the central clearing house network is configured for data communication with the SVU network via the telco gateway; and
      (iii) wherein the central clearing house network is configured to:
         (1) receive each stored value update request from the SVU manager of the SVU network via the telco gateway;
         (2) direct each stored value update request to the issuer host of at least one card issuer network;
         (3) create a pending transaction status and an approved reload amount for each stored value update request; and
         (4) direct the pending transaction status to the SVU network for settlement of the stored value update request with the SVC associated with the stored value update request via the telco gateway.

2. The system according to claim 1,
   (a) wherein the first hardware security module is configured to, for each stored value update request, generate an encrypted authentication request based on at least the SVC identifier of the stored value update request, wherein the encrypted authentication request is encrypted based on at least a terminal session key; and
   (b) wherein the second hardware security module is configured to, for each stored value update request, decrypt the encrypted authentication request based on the terminal session key and authenticate the encrypted authentication request using at least a card master key.

\* \* \* \* \*